US012666431B2

(12) United States Patent
Maemoto et al.

(10) Patent No.:  US 12,666,431 B2
(45) Date of Patent:     Jun. 23, 2026

(54) COMMUNICATION APPARATUS, BASE STATION APPARATUS, AND COMMUNICATION METHOD

(71) Applicants: DENSO CORPORATION, Kariya-city (JP); TOYOTA JIDOSHA KABUSHIKI KAISHA, Toyota (JP)

(72) Inventors: Daiki Maemoto, Kariya-city (JP); Hideaki Takahashi, Kariya-city (JP)

(73) Assignees: DENSO CORPORATION, Kariya-city (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 342 days.

(21) Appl. No.: 18/426,187

(22) Filed: Jan. 29, 2024

(65) Prior Publication Data

US 2024/0172236 A1     May 23, 2024

Related U.S. Application Data

(63) Continuation of application No. PCT/JP2022/029559, filed on Aug. 1, 2022.

(30) Foreign Application Priority Data

Aug. 5, 2021     (JP) ................................. 2021-128925

(51) Int. Cl.
*H04W 72/21*          (2023.01)
*H04L 1/1812*         (2023.01)
(Continued)

(52) U.S. Cl.
CPC ........... *H04W 72/21* (2023.01); *H04L 1/1812* (2013.01); *H04L 5/0012* (2013.01); *H04W 72/0453* (2013.01); *H04W 72/0457* (2023.01)

(58) Field of Classification Search
CPC ............. H04W 72/21; H04W 72/0453; H04W 72/0457; H04L 1/1812; H04L 5/0012
See application file for complete search history.

(56) References Cited

U.S. PATENT DOCUMENTS

| | | | |
|---|---|---|---|
| 2023/0189232 A1* | 6/2023 | Rastegardoost | ...... H04L 5/0012 370/329 |
| 2023/0254868 A1* | 8/2023 | Hou | ...................... H04L 5/0058 370/329 |

FOREIGN PATENT DOCUMENTS

| | | |
|---|---|---|
| EP | 4429389 A1 | 9/2024 |
| WO | WO-2020230222 A1 | 11/2020 |

OTHER PUBLICATIONS

3GPP TS 38.211(Ver.16.6.0) (Jun. 2021) 3rd Generation Partnership Project; Technical Specification Group Radio Access Network; NR; Physical channels and modulation (Release 16), pp. 1-134.

(Continued)

*Primary Examiner* — Derrick V Rose
(74) *Attorney, Agent, or Firm* — Harness, Dickey & Pierce, P.L.C.

(57) ABSTRACT

A communication apparatus comprises: a controller; and a receiver configured to receive, from a base station apparatus, a system information block 1 (SIB1), wherein in a case where first information for configuring an initial uplink bandwidth part (BWP), second information for configuring a resource of a physical uplink control channel (PUCCH) for transmission of HARQ-ACK, and third information for indicating whether or not intra-slot frequency hopping for transmission of the PUCCH is enabled are included in the SIB1, and a case where the communication apparatus does not receive information specific to the communication apparatus for configuring a resource of the PUCCH, the controller is configured to determine whether or not the intra-slot frequency hopping for transmission of the PUCCH is (Continued)

enabled based on the third information, and determine, based on the second information, the resource of the PUCCH on the initial uplink BWP configured based on the first information, and the first information includes information for indicating frequency domain location and bandwidth of the initial uplink BWP and information for indicating a subcarrier spacing of the initial uplink BWP.

15 Claims, 8 Drawing Sheets

(51) Int. Cl.
| | | |
|---|---|---|
| *H04L 5/00* | (2006.01) | |
| *H04W 72/0453* | (2023.01) | |
| *H04W 72/0457* | (2023.01) | |

(56) References Cited

OTHER PUBLICATIONS

3GPP TS 38.213(Ver.16.6.0), (Jun. 2021), 3rd Generation Partnership Project; Technical Specification Group Radio Access Network; NR; Physical layer procedures for control (Release 16), pp. 1-187.

R1-2104179, 3GPP TSG-RAN WG1 Meeting #105-e, e-Meeting, May 19-27, 2021, Reduced maximum UE bandwidth for RedCap, Ericsson, pp. 1-29.
R1-2104283, 3GPP TSG RAN WG1 #105-e, e-Meeting, Huawei, HiSilicon, Discussion on reduced maximum UE bandwidth for RedCap, May 10-27, 2021, pp. 1-13.
R1-2104365, 3GPP TSG RAN WG1 #105-e, e-Meeting, vivo, Guangdong Genius, Discussion on reduced maximum UE bandwidth, May 10-27, 2021, pp. 1-6.
R1-2104543, 3GPP TSG RAN WG1 Meeting #105-e, Nokia, Nokia Shanghai Bell, UE Complexity Reduction Aspects Related to Reduced Maximum UE Bandwidth, e-Meeting, May 19-27, 2021, pp. 1-5.
R1-2104677, 3GPP TSG-RAN WG1 Meeting #105, Qualcomm Incorporated, BW Reduction for RedCap UE, e-Meeting, May 10-27, 2021, pp. 1-17.
R1-2104782, 3GPP TSG RAN WG1 #105-e, OPPO, Discussion on reduced UE bandwidth, e-Meeting, May 10-27, 2021, pp. 1-12.
R1-2105983, 3GPP TSG RAN WG1 #105-e, Samsung, Bandwidth Reduction for RedCap UEs, e-Meeting, May 10-27, 2021, pp. 1-11.

* cited by examiner

BASE STATION

230

NETWORK COMMUNICATOR

240

CONTROLLER

220

RADIO COMMUNICATOR

221

RECEIVER

222

TRANSMITTER

FIG. 5

BASE STATION 200

UE100

S101

S102

COMMON CONFIGURATION INFORMATION

UPLINK TRANSMISSION

FIG. 7

COMMUNICATION APPARATUS, BASE STATION APPARATUS, AND COMMUNICATION METHOD

CROSS-REFERENCE TO RELATED APPLICATIONS

The present application is a continuation application of international Patent Application No. PCT/JP2022/029559, filed on Aug. 1, 2022, which designated the U.S., and claims the benefit of priority of Japanese Patent Application No. 2021-128925, filed on Aug. 5, 2021, the entire contents of which are incorporated herein by reference.

TECHNICAL FIELD

The present disclosure relates to a communication apparatus, a base station apparatus, and a communication method used in a mobile communication system.

BACKGROUND ART

In recent years, in 3GPP (registered trademark; the same applies hereinafter) (3rd Generation Partnership Project) that is a mobile communication system standardization project, it has been studied to provide a specific communication apparatus having a lower communication capability than that of a general communication apparatus in a 5G system. The specific communication apparatus is a communication apparatus having middle range performance and price for Internet of Things (IoT), and for example, a maximum bandwidth of a bandwidth part used for radio communication is configured narrower or the number of receivers is smaller as compared with the general communication apparatus.

Operating the specific communication apparatus in a frequency band in which the general communication apparatus operates has been studied. As described above, frequency bands in which the general communication apparatus and the specific communication apparatus operate are caused to coexist, so that the frequency can be efficiently operated.

Non Patent Literature 1 proposes that, in a case where frequency bands of a general communication apparatus and a specific communication apparatus are caused to coexist, a bandwidth part of the specific communication apparatus is arranged on an end side in a frequency direction of a bandwidth part in which a physical uplink control channel (PUCCH) resource of the general communication apparatus is arranged such that a physical uplink shared channel (PUSCH) resource of the general communication apparatus is not divided in the frequency direction by a PUCCH resource used for transmission of a physical uplink control channel (PUCCH) of the specific communication apparatus.

CITATION LIST

Non Patent Literature

Non Patent Literature 1: 3GPP Contribution "R1-2104283"

SUMMARY OF INVENTION

A communication apparatus according to a first aspect comprises a controller and a communicator configured to receive a system information block 1. In a case where first information for configuring an initial uplink bandwidth part, second information for configuring a resource of a physical uplink control channel, and information indicating whether or not intra-slot frequency hopping for transmission of the physical uplink control channel is valid are included in the system information block 1, and a case where the communication apparatus does not have information for configuring a resource of a physical uplink control channel specific to the communication apparatus, the controller is configured to determine whether or not the intra-slot frequency hopping for transmission of the physical uplink control channel is valid based on the information indicating whether or not the intra-slot frequency hopping is valid, and determine a resource of the physical uplink control channel in the initial uplink bandwidth part specified based on the first information based on the second information. The first information includes information indicating a location and a bandwidth in a frequency domain of the initial uplink bandwidth part and information indicating a subcarrier spacing of the initial uplink bandwidth part.

A base station apparatus according to a second aspect is the base station apparatus communicating with a communication apparatus. The base station apparatus comprises: a controller including, in the system information block 1, first information for configuring an initial uplink bandwidth part, second information for configuring a resource of a physical uplink control channel, and information indicating whether or not intra-slot frequency hopping for reception of the physical uplink control channel is valid; and a communicator configured to transmit the system information block 1 to the communication apparatus in which information for configuring a resource of a physical uplink control channel specific to the communication apparatus is not configure. The first information includes information indicating a location and a bandwidth in a frequency domain of the initial uplink bandwidth part and information indicating a subcarrier spacing of the initial uplink bandwidth part.

A communication method according to a third aspect is the communication method executed by a communication apparatus. The communication method comprises the steps of: receiving a system information block 1; and in a case where first information for configuring an initial uplink bandwidth part, second information for configuring a resource of a physical uplink control channel, and information indicating whether or not intra-slot frequency hopping for transmission of the physical uplink control channel is valid are included in the system information block 1, and a case where the communication apparatus does not have information for configuring a resource of a physical uplink control channel specific to the communication apparatus, determining whether or not the intra-slot frequency hopping for transmission of the physical uplink control channel is valid based on the information indicating whether or not the intra-slot frequency hopping is valid, and determining a resource of the physical uplink control channel in the initial uplink bandwidth part specified based on the first information based on the second information. The first information includes information indicating a location and a bandwidth in a frequency domain of the initial uplink bandwidth part and information indicating a subcarrier spacing of the initial uplink bandwidth part.

BRIEF DESCRIPTION OF DRAWINGS

Objects, features, advantages, and the like of the present disclosure will become more apparent from the following detailed description with reference to the accompanying drawings.

FIG. 2 is a diagram illustrating a configuration example of a protocol stack according to the embodiment.

FIG. 4 is a diagram illustrating a configuration of a base station according to the embodiment.

FIG. 5 is a sequence diagram illustrating a first operation example of the mobile communication system according to the embodiment.

FIG. 7 is a sequence diagram illustrating a second operation example of the mobile communication system according to the embodiment.

DESCRIPTION OF EMBODIMENTS

Figure 1:
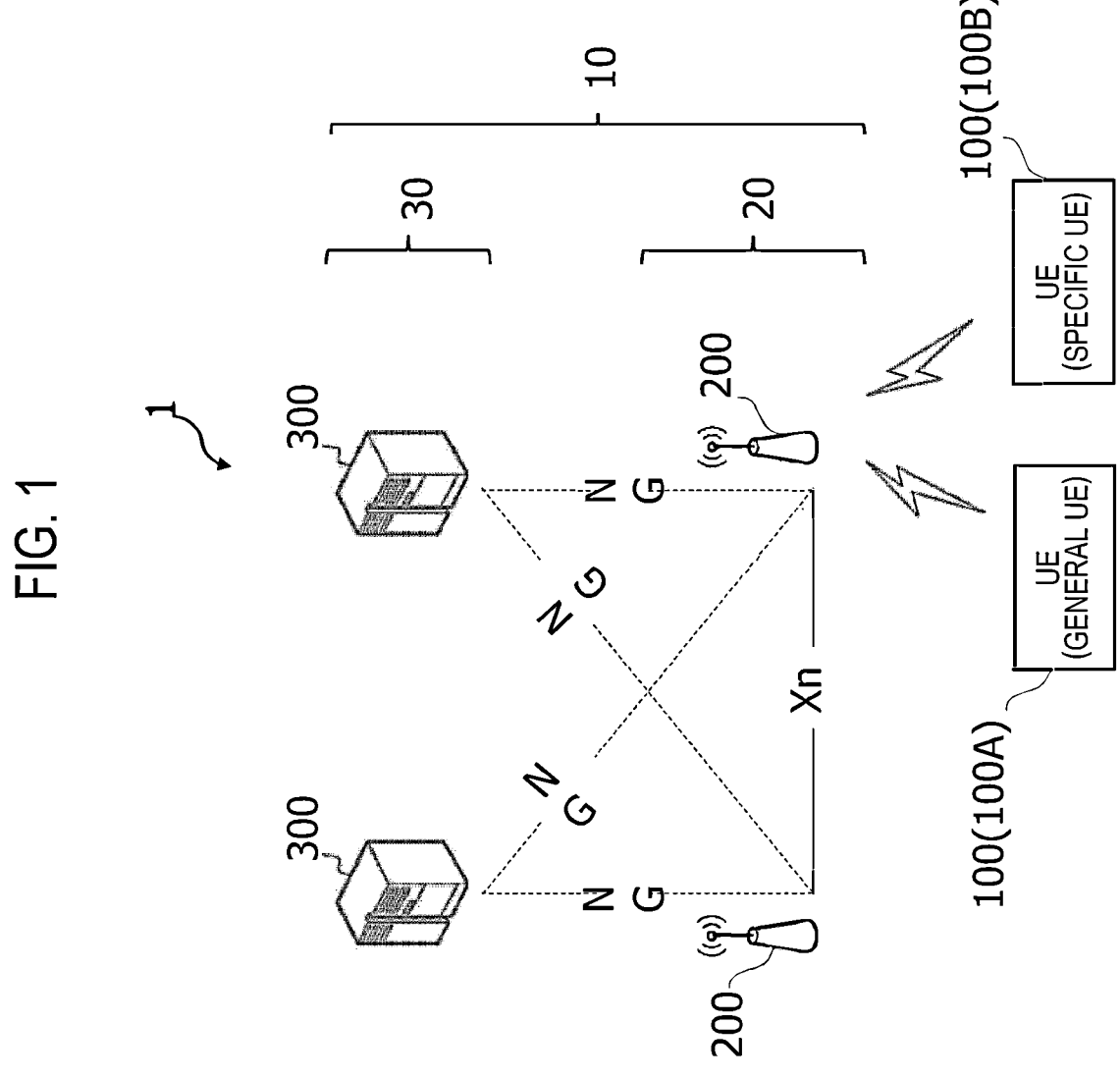
FIG. 1 is a diagram illustrating a configuration of a mobile communication system according to an embodiment.

A mobile communication system according to an embodiment will be described with reference to the drawings. In the description of the drawings, the same or similar parts are denoted by the same or similar reference numerals.

In a case where frequency bands of communication apparatuses having different communication capabilities such as a general communication apparatus and a specific communication apparatus are caused to coexist, a method for appropriately controlling radio resources used for uplink transmission is demanded. Therefore, an object of the present disclosure is to provide a communication apparatus, a base station, and a communication method capable of appropriately controlling radio resources used for uplink transmission in a case where frequency bands of communication apparatuses having different communication capabilities are caused to coexist.

(System Configuration)

First, a configuration of a mobile communication system 1 according to the present embodiment will be described with reference to FIG. 1. The mobile communication system 1 is, for example, a system conforming to a technical specification (TS) of 3GPP. Hereinafter, as the mobile communication system 1, a description will be given, as an example, as to the 5th generation system (5G system) of the 3GPP standard, that is, a mobile communication system based on NR (New Radio).

The mobile communication system 1 includes a network 10 and a user equipment (UE) 100 that communicates with the network 10. The network 10 includes a NG-RAN (Next Generation Radio Access Network) 20, which is a 5G radio access network, and a 5GC (5G Core Network) 30, which is a 5G core network.

The UE 100 is an example of a communication apparatus. The UE 100 may be a mobile radio communication apparatus. The UE 100 may be an apparatus used by a user. The UE 100 is, for example, a mobile apparatus such as a mobile phone terminal such as a smartphone, a tablet terminal, a notebook PC, a communication module, or a communication card. The UE 100 may be a vehicle (for example, a car, a train, or the like) or an apparatus (for example, a vehicle UE) provided in the vehicle. The UE 100 may be a transport body other than the vehicle (for example, a ship, an airplane, a flight vehicle, or the like) or an apparatus (for example, an aerial UE) provided in the transport body. The UE 100 may be a sensor or an apparatus provided in the sensor. Note that the UE 100 may be referred to as another name such as a mobile station, a mobile terminal, a mobile apparatus, a mobile unit, a subscriber station, a subscriber terminal, a subscriber apparatus, a subscriber unit, a wireless station, a wireless terminal, a wireless apparatus, a wireless unit, a remote station, a remote terminal, a remote apparatus, or a remote unit.

In the present embodiment, as the UE 100 of NR, two types of UEs are assumed, that is, a general user equipment (general UE) 100A and a specific user equipment (specific UE) 100B having a lower communication capability than that of the general UE 100A. The general UE 100A has an advanced communication capability such as a high speed and high capacity (enhanced Mobile Broadband: eMBB) and ultra-reliable low delay (Ultra-Reliable and Low Latency Communications: URLLC), which are characteristics of NR. Therefore, the general UE 100A has a higher communication capability than the specific UE 100B. The specific UE 100B is a UE whose apparatus cost and complexity are reduced as compared with the general UE 100A. The specific UE 100B is the UE 100 having the performance and price of the middle range for the IoT, and for example, the maximum bandwidth used for the radio communication is configured narrower or the number of receivers is smaller than that of the general UE 100A. Note that the receiver may be referred to as a reception branch. The specific UE 100B may be referred to as a reduced capability NR device or a RedCap UE. Hereinafter, for clarity of description, the general UE or the specific UE is also described, but the general UE or the specific UE in the present embodiment is a UE. That is, the general UE in the present embodiment may be replaced with a UE. In addition, the specific UE in the present embodiment may be replaced with a UE.

Specifically, the specific UE 100B may be able to communicate at a communication speed equal to or higher than a communication speed defined by a LPWA (Low Power Wide Area) standard, for example, LTE Cat. (Long Term Evolution UE Category) 1/1 bis, LTE Cat.M1 (LTE-M), and LTE Cat.NB1 (NB-IoT). The specific UE 100B may be capable of communicating with a bandwidth equal to or larger than a bandwidth defined by the LPWA standard. The specific UE 100B may have a restricted bandwidth used for communication as compared with the UE of Rel-15 or Rel-16. For example, regarding a FR1 (Frequency Range 1), the maximum bandwidth (also referred to as the UE maximum bandwidth) supported by the specific UE 100B may be 20 MHz. In addition, regarding a FR2 (Frequency Range 2), the maximum bandwidth supported by the specific UE 100B may be 100 MHz. The specific UE 100B may have only one receiver that receives a radio signal. The specific UE 100B may be, for example, a wearable apparatus, a sensor apparatus, or the like.

The NG-RAN 20 includes a plurality of base stations 200. The base station 200 may be referred to as a base station apparatus. Each of the base stations 200 manages at least one cell. A cell forms a minimum unit of a communication area. One cell belongs to one frequency (carrier frequency). The term "cell" may represent a radio communication resource, and may also represent a communication object of the UE 100. Each base station 200 can perform radio communication with the UE 100 existing in its own cell. The base station 200 communicates with the UE 100 by using a protocol stack of the RAN. Details of the protocol stack will be described later. Further, the base station 200 is connected to another base station 200 (which may also be referred to as an adjacent base station) via an Xn interface. The base station 200 communicates with the adjacent base station via the Xn interface. In addition, the base station 200 provides NR user plane and control plane protocol terminations towards the UE 100 and is connected to the 5GC 30 via an NG interface. Such an NR base station 200 may be referred to as a gNodeB (gNB).

The 5GC 30 includes a core network apparatus 300. The core network apparatus 300 includes, for example, an AMF (Access and Mobility Management Function) and/or a UPF (User Plane Function). The AMF performs mobility management of the UE 100. The UPF provides a function specialized for U-plane processing. The AMF and the UPF are connected to the base station 200 via the NG interface.

(Configuration Example of Protocol Stack)

Figure 2:
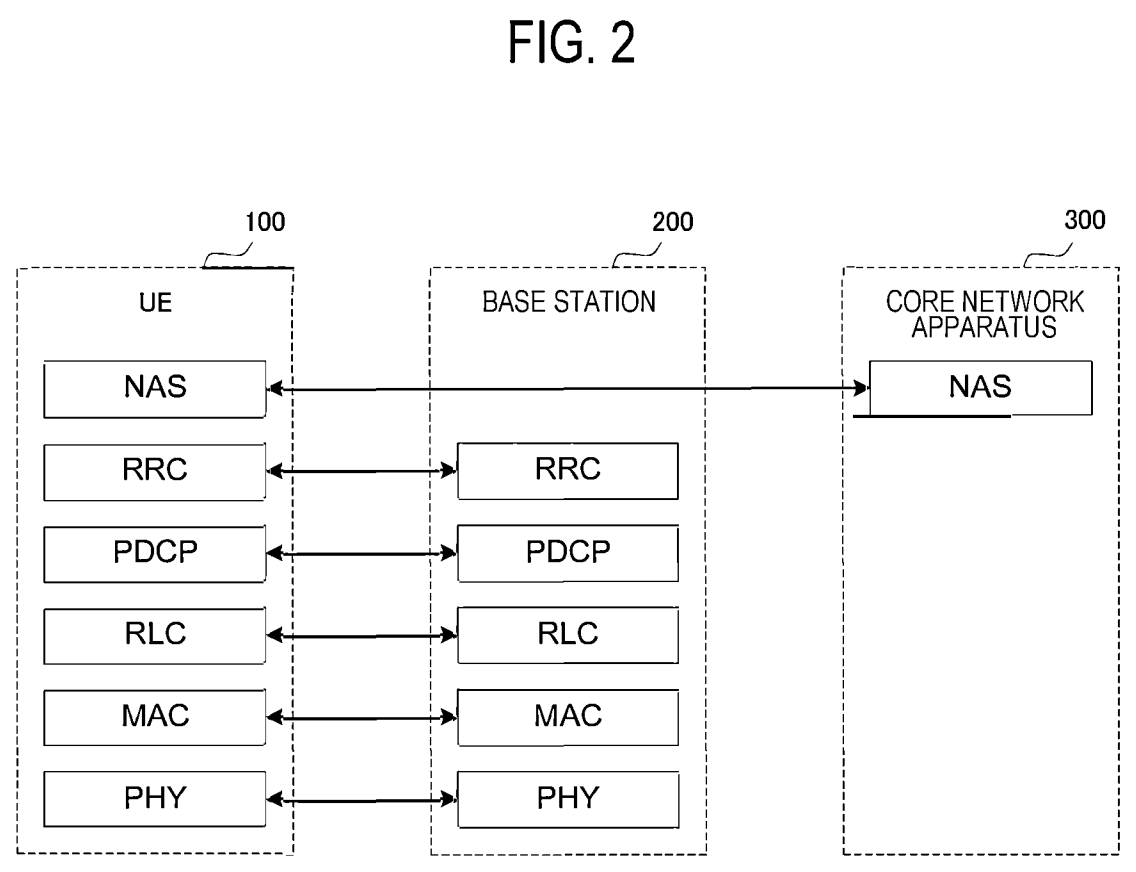

Next, a configuration example of the protocol stack according to the present embodiment will be described with reference to FIG. 2.

A protocol of a radio section between the UE 100 and the base station 200 includes a physical (PHY) layer, a MAC (Medium Access Control) layer, a RLC (Radio Link Control) layer, a PDCP (Packet Data Convergence Protocol) layer, and a RRC (Radio Resource Control) layer.

The PHY layer performs encoding/decoding, modulation/demodulation, antenna mapping/demapping, and resource mapping/demapping. Data and control information are transmitted between the PHY layer of the UE 100 and the PHY layer of the base station 200 via a physical channel.

The MAC layer performs priority control of data, retransmission processing by hybrid ARQ (HARQ (Hybrid Automatic Repeat reQuest)), a random access procedure, and the like. Data and control information are transmitted between the MAC layer of the UE 100 and the MAC layer of the base station 200 via a transport channel. The MAC layer of the base station 200 includes a scheduler. The scheduler determines uplink and downlink transport formats (transport block size, and modulation and coding scheme (MCS)), and resources allocated to the UE 100.

The RLC layer transmits data to the RLC layer on the reception side using the functions of the MAC layer and the PHY layer. Data and control information are transmitted between the RLC layer of the UE 100 and the RLC layer of the base station 200 via a logical channel.

The PDCP layer performs header compression/decompression and encryption/decryption.

A SDAP (Service Data Adaptation Protocol) layer may be provided as an upper layer of the PDCP layer. The SDAP (Service Data Adaptation Protocol) layer performs mapping between an IP flow to be a unit in which a core network performs QOS (Quality of Service) control, and a radio bearer to be a unit in which an AS (Access Stratum) performs QoS control.

The RRC layer controls a logical channel, a transport channel, and a physical channel according to establishment, reestablishment, and release of the radio bearer. RRC signaling for various configurations is transmitted between the RRC layer of the UE 100 and the RRC layer of the base station 200. In a case where there is an RRC connection between the RRC of the UE 100 and the RRC of the base station 200, the UE 100 is in an RRC connected state. In a case where there is no RRC connection between the RRC of the UE 100 and the RRC of the base station 200, the UE 100 is in an RRC idle state. In a case where the RRC connection between the RRC of the UE 100 and the RRC of the base station 200 is suspended, the UE 100 is in an RRC inactive state.

A NAS layer located above the RRC layer in the UE 100 performs session management and mobility management of the UE 100. NAS signaling is transmitted between the NAS layer of the UE 100 and the NAS layer of the core network apparatus 300.

Note that the UE 100 has an application layer and the like in addition to the protocol of the radio interface.

(Radio Frame Configuration)

In a 5G system, downlink transmission and uplink transmission are configured in a radio frame of 10 ms duration. For example, the radio frame includes 10 subframes. For example, one subframe may be 1 ms. Furthermore, one subframe may include one or more slots. For example, the number of symbols forming one slot is normally 14 for a CP (Cyclic Prefix) and 12 for an extended CP. In addition, the number of slots forming one subframe changes according to the configured subcarrier spacing. For example, for the normal CP, when 15 kHz is configured as the subcarrier spacing, the number of slots per subframe is 1 (that is, 14 symbols), when 30 kHz is configured as the subcarrier spacing, the number of slots per subframe is 2 (that is, 28 symbols), when 60 kHz is configured as the subcarrier spacing, the number of slots per subframe is 4 (that is, 56 symbols), and when 120 kHz is configured as the subcarrier spacing, the number of slots per subframe is 8 (that is, 128 symbols). In addition, for the extended CP, when 60 kHz is configured as the subcarrier spacing, the number of slots per subframe is 4 (that is, 48 symbols). That is, the number of slots forming one subframe is determined based on the subcarrier spacing configured by the base station 200. In addition, the number of symbols forming one subframe is determined based on the subcarrier spacing configured by the base station 200. That is, the number of symbols forming the subframe of 1 ms is determined based on the subcarrier spacing configured by the base station 200, and the length (length in a time direction) of each symbol changes.

(Bandwidth Part)

The UE 100 and the base station 200 perform communication using a bandwidth part (BWP) that is a subset of a total bandwidth of the cell. Specifically, the base station 200 configures one or more BWPs for the UE 100. The base station 200 can notify the UE 100 of a BWP (that is, an active BWP) used for communication with the base station 200 among the configured one or more BWPs. Specifically, the base station 200 can transmit, to the UE 100, an identifier indicating a BWP to be activated at the time of performing the configuration, that is, a BWP to be first used in communication with the base station 200. Furthermore, for control of switching from the active BWP to a BWP that is not the active BWP (hereinafter, the inactive BWP) and switching from the inactive BWP to the active BWP (so-called BWP switching), for example, a physical downlink control channel (for example, downlink assignment and uplink assignment), a timer (that is, bwp-InactivityTimer), RRC signaling, a MAC entity, or the like is used.

Here, the communication in the BWP (that is, the active BWP) may include at least one of transmission on an uplink-shared channel (UL-SCH) in the BWP, transmission on a random access channel (RACH) in the BWP (when a physical random access channel (Physical RACH: PRACH) occasion is configured), monitoring of a physical downlink control channel (PDCCH) in the BWP, transmission on a physical uplink control channel (PUCCH) in the BWP (when a PUCCH resource is configured), a report of channel state information (CSI) for the BWP, and reception of a downlink-shared channel (DL-SCH) in the BWP.

Here, the UL-SCH is a transport channel and is mapped to a physical uplink shared channel (PUSCH) which is a physical channel. The data transmitted by the UL-SCH is also referred to as UL-SCH data. For example, it may correspond to UL-SCH data and uplink user data. Further, the DL-SCH is a transport channel and is mapped to a physical downlink shared channel (PDSCH) which is a physical channel. The data transmitted by the DL-SCH is also referred to as DL-SCH data. For example, it may correspond to DL-SCH data and downlink user data.

In addition, the PUCCH is used to transmit uplink control information. For example, the uplink control information includes a HARQ-ACK (Hybrid Automatic Repeat Request), CSI, and/or a SR (Scheduling Request). The HARQ-ACK includes a positive acknowledgment or a negative acknowledgment. For example, the PUCCH is used to transmit the HARQ-ACK for the PDSCH (that is, the DL-SCH (DL-SCH data and downlink user data)). Here, the DL-SCH data and/or the downlink user data are also referred to as a downlink transport block.

The BWP includes an initial bandwidth part (initial BWP) and a bandwidth part (dedicated BWP) dedicated to each UE 100. The initial BWP is used at least for initial access of the UE 100. The initial BWP is commonly used by a plurality of UEs 100. For example, the initial BWP is configured using a parameter (cell-specific parameter) common to a plurality of UEs 100. The initial BWP includes an initial BWP for downlink communication (hereinafter, the initial downlink BWP (initial DL BWP)) and an initial BWP for uplink communication (hereinafter, the initial uplink BWP (initial UL BWP)). For example, a value of an identifier (that is, bwp-id) indicating each of the initial downlink BWP and the initial uplink BWP may be 0.

The UE 100 can specify the initial BWP (that is, the initial downlink BWP and the initial uplink BWP) by two methods, for example. In the first method, the UE 100 specifies the initial BWP based on CORESET #0 configured using information included in a master information block (MIB) in a physical broadcast channel (PBCH). In the second method, the UE 100 specifies the initial BWP based on a location and a bandwidth in a frequency domain configured using information included in a system information block (SIB). For example, the UE 100 may apply the BWP specified by the first method to the communication with the base station 200 until the reception of a message 4 in the random access procedure. For example, after receiving the message 4 (Msg. 4), the UE 100 may apply the BWP specified by the second method to the communication with the base station 200. Here, the message 4 in the random access procedure may include an RRC setup message, an RRC resume message, and/or an RRC (re) establishment message.

The dedicated BWP is dedicated to the UE 100. The dedicated BWP includes a dedicated BWP for downlink communication (hereinafter, a dedicated downlink BWP (UE dedicated DL BWP)) and a dedicated BWP for uplink communication (hereinafter, a dedicated uplink BWP (UE dedicated UL BWP)). For example, a value of an identifier indicating each of the dedicated downlink BWP and the dedicated uplink BWP may be other than 0.

In the UE 100, for example, the dedicated BWP is configured based on information (for example, the downlink BWP information (that is, BWP-Downlink) and the uplink BWP information (that is, BWP-Uplink)) included in the RRC message. Each of the downlink BWP information and the dedicated uplink BWP information may include, for example, at least one of information (for example, locationAndBandwidth) indicating a location and a bandwidth in the frequency domain, information (for example, subcarrier- Spacing) indicating a subcarrier spacing, and information (for example, cyclicPrefix) indicating an extended cyclic prefix.

(Resource Block)

A resource block (RB) is defined as 12 consecutive subcarriers in the frequency domain. For example, a common resource block (CRB), a physical resource block (PRB), or the like is defined as the RB. The common resource block is numbered in ascending order from 0 in the frequency domain of the subcarrier spacing configuration μ. The physical resource block (PRB) of the subcarrier spacing configuration μ is defined in the bandwidth part and numbered from 0 to the following number (PRB number described below). Hereinafter, the number of the PRB is also referred to as a PRB index. That is, in the present embodiment, the number of the PRB and the PRB index may be the same.

$$N_{BWP,i}^{size,\mu} - 1 \qquad \text{[Formula 1]}$$

$$N_{BWP,i}^{size,\mu}:$$

size of bandwidth part i

In addition, a relation between the common resource block and the physical resource block is given by the following equation.

$$n_{CRB}^{\mu} = n_{PRB}^{\mu} + N_{BWP,i}^{start,\mu} \qquad \text{[Formula 2]}$$

$$n_{CRB}^{\mu}:$$

nth common resource block $$n_{PRB}^{\mu}:$$

nth physical resource block $$N_{BWP,i}^{start,\mu}:$$

common resource block where the bandwidth part i starts for a common resource block 0

(PUCCH Resource)

For example, in a case where the first PUCCH configuration information is received and the second PUCCH configuration information is not received, the UE 100 determines the PUCCH resource in the initial uplink BWP based on information defined in advance. Here, the case where the first PUCCH configuration information and/or the second PUCCH configuration information is received may include a case where the UE 100 has (that is, stores) the first PUCCH configuration information and/or the second PUCCH configuration information. Further, the case where the first PUCCH configuration information and/or the second PUCCH configuration information is not received may include a case where the UE 100 does not have (that is, does not store) the first PUCCH configuration information and/or the second PUCCH configuration information. Hereinafter, a case where the UE 100 receives the first PUCCH configuration information and does not receive the second PUCCH configuration information is also referred to as a first case.

For example, the first PUCCH configuration information is PUCCH configuration common information (pucch-ConfigCommon). That is, the first PUCCH configuration information is a cell-specific parameter of the PUCCH. Further, for example, the second PUCCH configuration information is PUCCH configuration information (PUCCH-Config). That is, the second PUCCH configuration information is a UE-specific parameter of the PUCCH.

For example, one PUCCH resource may be indicated by associating an index (for example, an index from 0 to 15) with each of a plurality of PUCCH resources (for example, 16 PUCCH resources) and designating the index using the first PUCCH configuration information. Here, each of the plurality of PUCCH resources may include at least one of a PUCCH format, a first symbol used for the PUCCH, a duration (the number of symbols) used for the PUCCH, a PRB offset, and an initial cyclic shift (CS) index.

For example, in the first case, the UE 100 may determine the index by the following equation. In addition, the UE 100 determines the PUCCH resource based on the determined index.

$$r_{PUCCH} = \left\lfloor \frac{2 \cdot n_{CCE,0}}{N_{CCE}} \right\rfloor + 2 \cdot \Delta_{PRI} \qquad \text{[Formula 3]}$$

$$0 \le r_{PUCCH} \le 15$$

$r_{PUCCH}$: index
$N_{CCE}$: number of control channel elements (CCEs) in the CORESET of the PDCCH received with the DCI format
$n_{CCE,0}$: index of a first CCE of the received PDCCH
$\Delta_{PRI}$: value of a PUCCH resource indicator in the DCI format Furthermore, in the first case, the UE 100 may determine whether or not the equations 1 and 2 are satisfied. The UE 100 determines the PRB index of the PUCCH resource hopping in the frequency direction when the PUCCH resource is provided by the PUCCH resource common information and one of the equations 1 and 2 is satisfied. That is, the UE 100 determines PRB indexes of one or more PUCCH resources used for frequency hopping applied to PUCCH transmission.

[Formula 4]

$$\lfloor r_{PUCCH}/8 \rfloor = 0 \qquad \text{(Equation 1)}$$

$$\lfloor r_{PUCCH}/8 \rfloor = 1 \qquad \text{(Equation 2)}$$

For example, when the equation 1 is satisfied, the UE 100 determines the PRB index of the PUCCH resource (first PUCCH resource) used for the first hop and the PRB index of the PUCCH resource (second PUCCH resource) used for the second hop by the following equation. Here, the size of the initial uplink BWP in the "formula 5" may correspond to the size of the bandwidth part i in the "formula 1". That is, the PRB of the initial uplink BWP in the "formula 5" may correspond to the number (index) of the PRB.

[Formula 5]

PRB index of the PUCCH resource on the first hop:

$$RB_{BWP}^{offset} + \lfloor r_{PUCCH}/N_{CS} \rfloor$$

PRB index of the PUCCH resource on the second hop:

$$N_{BWP}^{size} - 1 - RB_{BWP}^{offset} - \lfloor r_{PUCCH}/N_{CS} \rfloor$$

$$RB_{BWP}^{offset}:$$

PRB offset $$N_{BWP}^{size}:$$

size of initial uplink BWP
$N_{CS}$: total number of initial CS indexes in a set of initial CS indexes When the equation 2 is satisfied, the UE 100 determines the PRB index of the PUCCH resource (first PUCCH resource) used for the first hop and the PRB index of the PUCCH resource (second PUCCH resource) used for the second hop by the following equation.

PRB index of the PUCCH resource on the first hop:

$$N_{BWP}^{size} - 1 - RB_{BWP}^{offset} - \lfloor (r_{PUCCH} - 8)/N_{CS} \rfloor$$

PRB index of the PUCCH resource on the second hop:

$$RB_{BWP}^{offset} + \lfloor (r_{PUCCH} - 8)/N_{CS} \rfloor$$

Note that the UE 100 may determine the initial CS index in the set of initial CS indexes by the following equation.

Case where the equation 1 is satisfied: $r_{PUCCH}$ mod $N_{CS}$

Case where the equation 2 is satisfied: $(r_{PUCCH} - 8)$ mod $N_{CS}$ [Formula 7]

When the second PUCCH configuration information is received, the UE 100 determines the PUCCH resource based on the second PUCCH configuration information. That is, when the second PUCCH configuration information is received, the UE 100 may determine the PUCCH resource based on the second PUCCH configuration information regardless of whether or not the first PUCCH configuration information is received. Hereinafter, a case where the UE 100 receives at least the second PUCCH configuration information (that is, it has the second PUCCH configuration information) will be also referred to as a second case.

For example, the second PUCCH configuration information may include at least one of PUCCH resource set information (PUCCH-ResourceSet), a PUCCH resource identifier (pucch-ResourceId), starting PRB information (startingPRB), second hop PRB information (secondHop-PRB), and intra-slot frequency hopping information (intraSlotFrequencyHopping). For example, the PUCCH resource set information indicates a PUCCH resource set. In addition, the PUCCH resource identifier indicates a PUCCH resource index. In addition, the PUCCH resource set is associated with the PUCCH resource index. In addition, the starting PRB information indicates the first PRB index before frequency hopping or without frequency hopping. In addition, the second hop PRB information indicates the first PRB index after the frequency hopping. In addition, the intra-slot frequency hopping information indicates validity or invalidity of intra-slot frequency hopping. That is, in the second case, the UE 100 may determine the PUCCH resource (the PRB index of the PUCCH resource) applied to the PUCCH transmission based on the starting PRB information and/or the second hop PRB information.

For example, in the second case, a plurality of PUCCH resource sets may be configurable for the UE 100. For example, the UE 100 determines the PUCCH resource set used for the PUCCH transmission based on the PUCCH resource set information and the PUCCH resource identifier. In addition, the UE 100 determines the first PRB (that is, the PRB index of the PUCCH resource) before frequency hopping or without frequency hopping based on the starting PRB information. In addition, the UE 100 determines the first PRB (that is, the PRB index of the PUCCH resource) after the frequency hopping based on the second hop PRB information. In addition, the UE 100 determines validity or invalidity of intra-slot frequency hopping based on the intra-slot frequency hopping information. That is, the UE 100 executes intra-slot frequency hopping in a case where the intra-slot frequency hopping is configured to be valid. In addition, the UE 100 does not execute intra-slot frequency hopping in a case where the intra-slot frequency hopping is configured to be invalid.

Note that the UE 100 may determine the PUCCH resource by another method different from the above-described method. For example, in a case where predetermined information (for example, useInterlacePUCCH-PUSCH) is received, the UE 100 may determine the PUCCH resource by another method.

In addition, the UE 100 transmits the PUCCH using the determined PUCCH resource. Note that the UE 100 determines a PRB with a number corresponding to the determined index of the physical resource block (PRB) as a PRB used for transmission of the PUCCH. That is, in the first case, the UE 100 may perform the PUCCH transmission with the frequency hopping by using the PUCCH resource (for example, the first PUCCH resource and the second PUCCH resource) of the determined PRB index. In the second case, the UE 100 may perform the PUCCH transmission with the frequency hopping by using the PUCCH resource (for example, a PUCCH resource determined based on the starting PRB information and a PUCCH resource determined based on the second hop PRB information) of the determined PRB index.

(Configuration of User Equipment)

Figure 3:
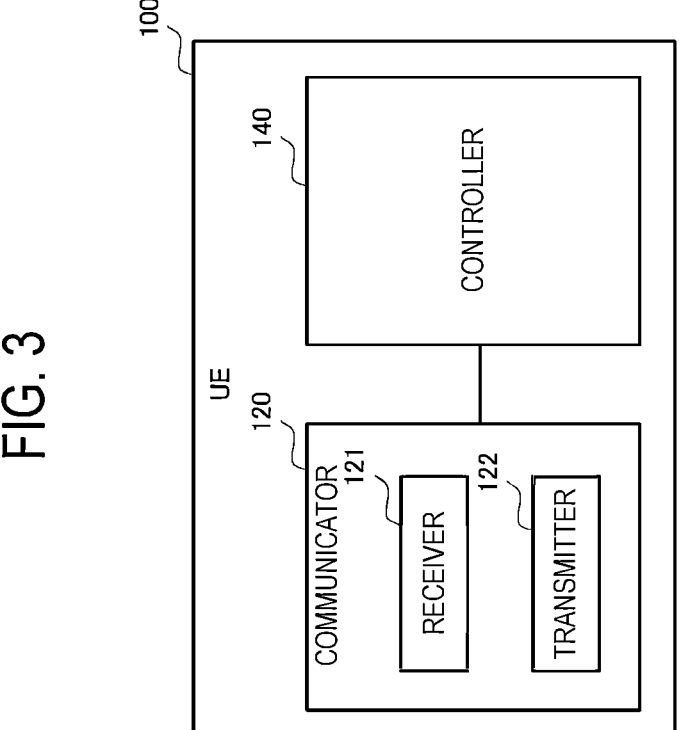
FIG. 3 is a diagram illustrating a configuration of a UE according to the embodiment.

Next, a configuration of the UE 100 according to the present embodiment will be described with reference to FIG. 3. The UE 100 includes a communicator 120 and a controller 140.

The communicator 120 performs radio communication with the base station 200 by transmitting and receiving a radio signal to and from the base station 200. The communicator 120 includes at least one receiver 121 and at least one transmitter 122. The receiver 121 and the transmitter 122 may be configured to include an antenna and an RF circuit. The antenna converts a signal into a radio wave and emits the radio wave into space. Further, the antenna receives a radio wave in space and converts the radio wave into a signal. The RF circuit performs analog processing of a signal transmitted and received via the antenna. The RF circuit may include a high frequency filter, an amplifier, a modulator, a low pass filter, and the like.

The receiver 121 may be referred to as a receiver (RX: Receiver). The transmitter 122 may be referred to as a transmitter (TX: Transmitter). When the UE 100 is the general UE 100A, the number of receivers included in the communicator 120 may be two to four. When the UE 100 is the specific UE 100B, the number of receivers included in the communicator 120 may be one or two.

The controller 140 performs various types of control in the UE 100. The controller 140 controls communication with the base station 200 via the communicator 120. Operation of the UE 100 to be described later may be operation under the control of the controller 140. The controller 140 may include at least one processor capable of executing a program and a memory that stores the program. The processor may execute the program to perform the operation of the controller 140. The controller 140 may include a digital signal processor that performs digital processing of a signal transmitted and received via the antenna and the RF circuit. The digital processing includes processing of the protocol stack of the RAN. Note that the memory stores a program executed by the processor, a parameter related to the program, and data related to the program. The memory may include at least one of a ROM (Read Only Memory), an EPROM (Erasable Programmable Read Only Memory), an EEPROM (Electrically Erasable Programmable Read Only Memory), a RAM (Random Access Memory), and a flash memory. All or a part of the memory may be included in the processor.

In the UE 100 configured as described above, the receiver 121 receives, from the base station 200, first information indicating at least one of the first PUCCH configuration, the frequency location, and the size, and second bandwidth part information indicating at least one of the frequency location and the size. The controller 140 specifies the initial uplink bandwidth part based on the first information. The transmitter 122 transmits the uplink control information by using the resource of the physical uplink control channel to which the frequency hopping is applied. The controller 140 determines the resource of the physical uplink control channel to which the frequency hopping is applied based on the first PUCCH configuration and the second bandwidth part information. As a result, the radio resources used for the uplink transmission can be appropriately controlled. By appropriately controlling the radio resources used for the uplink transmission, even in a case where frequency bands of user equipments having different communication capabilities are caused to coexist, it is possible to efficiently operate the frequency.

Further, the receiver 121 may receive at least third information used for another user equipment having a higher communication capability than the user equipment. When the first information is not configured, the controller 140 may specify the initial uplink bandwidth part based on the third information. As a result, even when the first information is not configured in the UE 100, the radio resources used for the uplink transmission can be appropriately controlled.

Further, the receiver 121 may receive at least third information used for another user equipment having a higher communication capability than the user equipment. When the second bandwidth part information is not configured, the controller 140 may determine the resource of the physical uplink control channel to which the frequency hopping is applied based on the third information. As a result, even when the second bandwidth part information is not configured in the UE 100, the radio resources used for the uplink transmission can be appropriately controlled.

In addition, the receiver 121 may receive fourth information for indicating a location of a center frequency of the initial uplink bandwidth part. The controller 140 may determine the resource of the physical uplink control channel to which the frequency hopping is applied based on the fourth information. As a result, the radio resources used for the uplink transmission can be more flexibly controlled.

In addition, the receiver 121 may receive fifth information used to configure validity or invalidity of frequency hopping applied to physical uplink control channel transmission. The controller 140 may determine whether or not to apply the frequency hopping to the physical uplink control channel transmission based on the fifth information. As a result, the radio resources used for the uplink transmission can be more flexibly controlled.

Note that the operation of the functional units (specifically, at least one of the communicator 120 and the controller 140) included in the UE 100 may be described as the operation of the UE 100.

(Configuration of Base Station)

Figure 4:
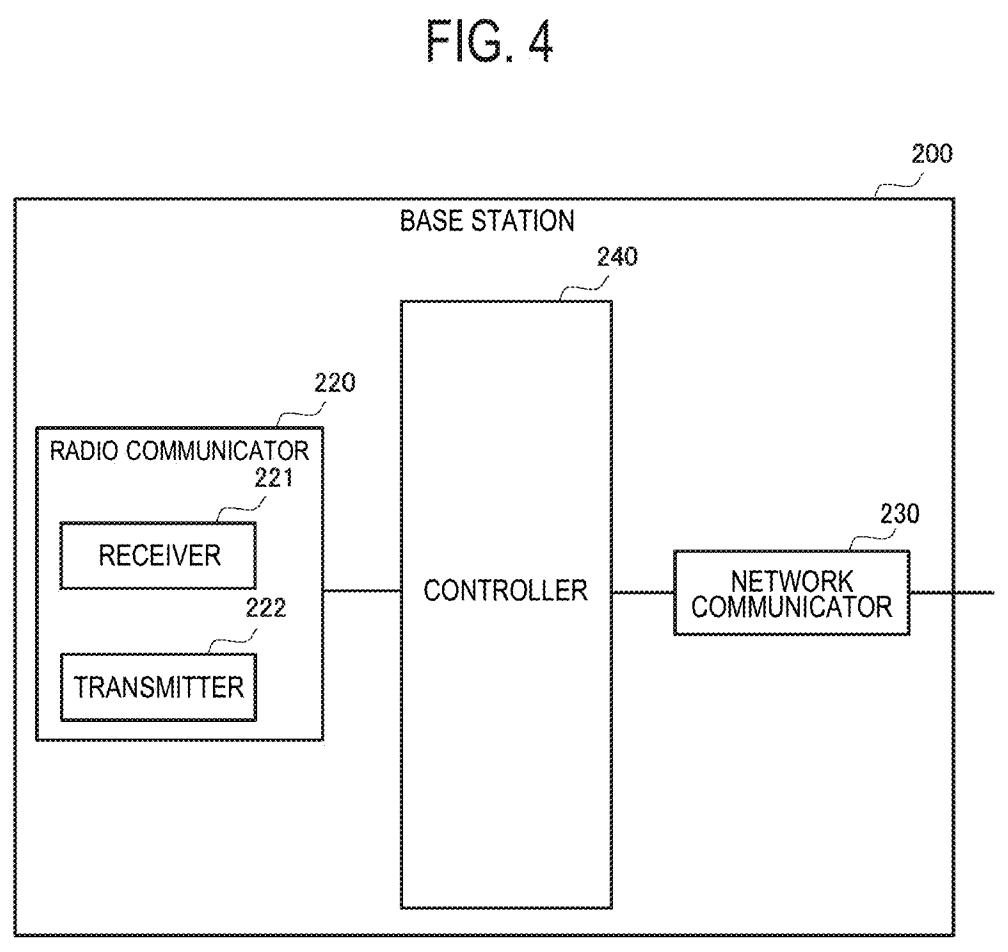

Next, a configuration of the base station 200 according to the present embodiment will be described with reference to FIG. 4. The base station 200 includes a radio communicator 220, a network communicator 230, and a controller 240.

The radio communicator 220 performs communication with the UE 100 via the antenna under the control of the controller 240. The radio communicator 220 includes a receiver 221 and a transmitter 222. The receiver 221 converts a radio signal received by the antenna into a received signal that is a baseband signal, performs signal processing on the received signal, and outputs the received signal to the controller 240. The transmitter 222 performs signal processing on a transmission signal that is a baseband signal output by the controller 240, converts the transmission signal into a radio signal, and transmits the radio signal from the antenna.

The network communicator 230 transmits and receives signals to and from the network. The network communicator 230 receives a signal from an adjacent base station connected via an Xn interface which is an inter-base station interface, for example, and transmits the signal to the adjacent base station. Further, the network communicator 230 receives a signal from the core network apparatus 300 connected via the NG interface, for example, and transmits the signal to the core network apparatus 300.

The controller 240 performs various types of control in the base station 200. The controller 240 controls, for example, communication with the UE 100 via the radio communicator 220. Furthermore, the controller 240 controls, for example, communication with a node (for example, the adjacent base station and the core network apparatus 300) via the network communicator 230. The operation of the base station 200 described later may be an operation under the control of the controller 240.

The controller 240 may include at least one processor capable of executing a program and a memory that stores the program. The processor may execute the program to perform the operation of the controller 240. The controller 240 may include a digital signal processor that performs digital processing of a signal transmitted and received via the antenna and the RF circuit. The digital processing includes processing of the protocol stack of the RAN. Note that the memory stores a program executed by the processor, a parameter related to the program, and data related to the program. All or a part of the memory may be included in the processor.

In the base station 200 configured as described above, the transmitter 222 transmits the first PUCCH configuration, the first information indicating the frequency location and the size, and the second bandwidth part information indicating the frequency location and/or the size to the UE 100. The controller 240 specifies the initial uplink bandwidth part based on the first information. The receiver 221 receives the uplink control information by using the resource of the physical uplink control channel to which the frequency hopping is applied. The controller 240 determines a resource of the physical uplink control channel to which the frequency hopping is applied based on the first PUCCH configuration and the second bandwidth part information. As a result, the radio resources used for the uplink transmission can be appropriately controlled. By appropriately controlling the radio resources used for the uplink transmission, even in a case where frequency bands of user equipments having different communication capabilities are caused to coexist, it is possible to efficiently operate the frequency.

Note that the operation of the functional unit (specifically, at least one of the radio communicator 220 (the receiver 221 and/or the transmitter 222), the network communicator 230, and the controller 240) included in the base station 200 may be described as the operation of the base station 200.

(System Operation)

(1) First Operation Example

A first operation example of the mobile communication system 1 will be described with reference to FIGS. 5 and 6. In the first operation example, the UE 100 performs PUCCH transmission based on the common configuration information.

Figure 5:
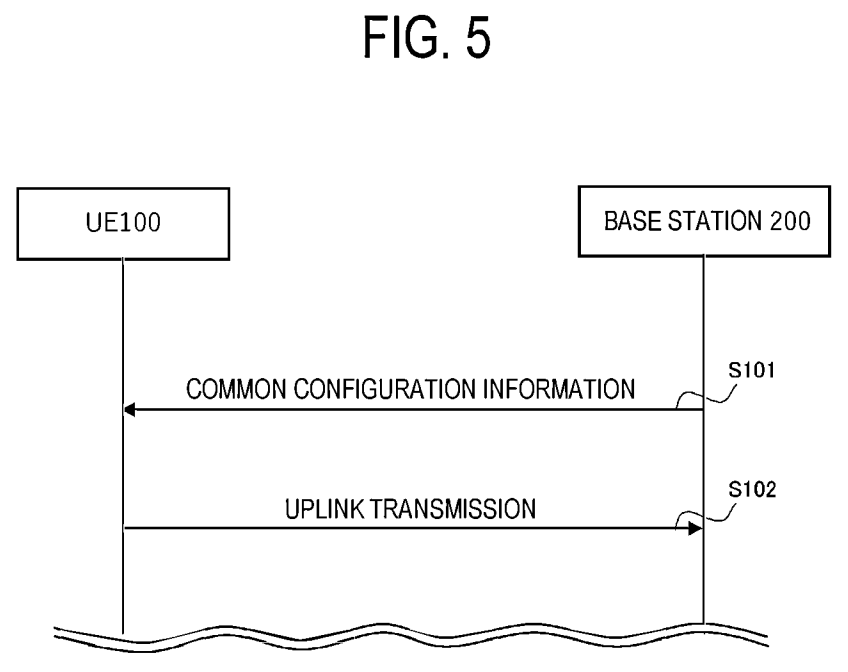

In FIG. 5, the UE 100 may be in the RRC idle state or the RRC inactive state between the UE 100 and the base station 200. For example, in FIG. 5, the UE 100 may be in a state in the first case. In addition, in FIG. 5, the UE 100 may be executing initial access. Furthermore, in FIG. 5, the UE 100 may be in a state before receiving the RRC setup message, the RRC resume message, and/or the RRC (re) establishment message. For example, in FIG. 5, the UE 100 may transmit HARQ-ACK for the message 4 (that is, the PDSCH) in the random access procedure.

Step S101:

The radio communicator 220 (transmitter 222) of the base station 200 transmits common configuration information including common parameters for uplink transmission to the UE 100. The communicator 120 of the UE 100 receives the common configuration information from the base station 200.

The radio communicator 220 transmits the common configuration information by broadcast. For example, the radio communicator 220 may transmit a system information block (for example, SIB1) including the common configuration information. That is, the common configuration information may be a cell-specific parameter.

For example, the common configuration information may be configuration information (specifically, UplinkConfig-CommonSIB) for providing the common uplink parameter of the cell. The common configuration information may include bandwidth part information for specifying a bandwidth part for uplink transmission (uplink BWP). In the present operation example, the bandwidth part information may be information for specifying an initial bandwidth part (initial uplink BWP) for uplink transmission. Hereinafter, in order to simplify the description, the initial uplink BWP is also referred to as an uplink BWP. That is, in the present embodiment, the uplink BWP may be replaced with the initial uplink BWP.

Here, the bandwidth part information may include first bandwidth part information (hereinafter, also referred to as first information) used to configure a first bandwidth part. Further, the bandwidth part information may include second bandwidth part information used to configure a second bandwidth part. Further, the bandwidth part information may include third bandwidth part information (hereinafter, third information) used to configure a third bandwidth part.

For example, the first bandwidth part may correspond to a first uplink BWP, and the second bandwidth part may correspond to a second uplink BWP. As an example, the first bandwidth part and/or the second bandwidth part may be an uplink BWP used for the specific UE 100B. For example, the first bandwidth part configured using the first information may be the initial uplink BWP used for the specific UE 100B. In addition, the second bandwidth part may be an uplink BWP used by the specific UE 100B to determine a PUCCH resource (that is, the PRB index of the PUCCH resource) for transmission of the uplink control information. That is, the first information may be used to specify the uplink BWP (for example, the initial uplink BWP), and the second bandwidth part information may be used to determine the PUCCH resource.

For example, the first information may include information (also referred to as locationAndBandwidth) indicating a frequency location and/or a size. As a result, the first information can indicate at least one of the frequency location and the size. In addition, the first information may include information (also referred to as subcarrierSpacing) indicating the subcarrier spacing. For example, the UE 100 may specify the first bandwidth part based on the information included in the first information. That is, the first information may include information for specifying the first bandwidth part. Here, as described above, the first bandwidth part may be the initial uplink BWP.

Further, the second bandwidth part information may include information (also referred to as locationAndBandwidth) indicating a frequency location and/or a size. As a result, the second bandwidth part information can indicate at least one of the frequency location and the size. In addition, the second bandwidth part information may include information (also referred to as subcarrierSpacing) indicating the subcarrier spacing. For example, the UE 100 may specify the second bandwidth part based on the information included in the second bandwidth part information. That is, the second bandwidth part information may include information for specifying the second bandwidth part.

In addition, the third bandwidth part may correspond to the third uplink BWP. As an example, the third bandwidth part may be at least an uplink BWP used for the general UE 100A. For example, the third bandwidth part configured by using the third information may be at least an initial uplink BWP used for the general UE 100A. That is, the third information may be used to specify the uplink BWP (for example, the initial uplink BWP). Here, the third bandwidth part may be an uplink BWP used by the specific UE 100B to determine a PUCCH resource (that is, the PRB index of the PUCCH resource) for transmission of the uplink control information. That is, the third information may be used to determine a PUCCH resource.

For example, the third information may include information (also referred to as locationAndBandwidth) indicating a frequency location and/or a size. In addition, the third information may include information (also referred to as subcarrierSpacing) indicating the subcarrier spacing. For example, the UE 100 may specify the third bandwidth part based on the information included in the third information. That is, the third information may include information for specifying the third bandwidth part.

That is, the UE 100 may determine the PUCCH resource based on the second bandwidth part information or the third information. For example, when the second bandwidth part information is configured, the UE 100 may determine the PUCCH resource based on the second bandwidth part information. Further, when the third information is configured and the second bandwidth part information is not configured, the UE 100 may determine the PUCCH resource based on the third information. As an example, when the second bandwidth part information is not configured, the specific UE 100B may determine the PUCCH resource based on the third information configured for the general UE 100A. That is, when the second bandwidth part used to determine the PUCCH resource is not configured, the specific UE 100B may determine the PUCCH resource based on the initial uplink BWP (that is, the third bandwidth part) used for the general UE 100A.

Hereinafter, for ease of description, the first information (and/or the first bandwidth part) and the second bandwidth part information (and/or the second bandwidth part) are used, but the second bandwidth part information (and/or the second bandwidth part) may be replaced with the third information (and/or the third bandwidth part) in the present embodiment.

That is, the UE 100 may determine the PUCCH resource used for the frequency hopping applied to the PUCCH transmission based on the second bandwidth part information. For example, the UE 100 may determine the PUCCH resource used for the frequency hopping applied to the PUCCH transmission based on the frequency location and/or the size configured based on the second bandwidth part information. In addition, the UE 100 may determine the PUCCH resource used for the frequency hopping applied to the PUCCH transmission based on the subcarrier spacing configured based on the second bandwidth part information.

For example, the UE 100 may determine the PUCCH resource by using one or more of "Formula 1" to "Formula 7" described above. For example, the UE 100 may use the subcarrier spacing configured based on the second bandwidth part information as the configuration $\mu$ of the subcarrier spacing in "Formula 1" and/or "Formula 2". In addition, the UE 100 may use the frequency location and/or the size configured based on the second bandwidth part information as a size of a bandwidth part i in "Formula 1" and/or "Formula 2". In addition, the UE 100 may use the frequency location and/or the size configured based on the second bandwidth part information as the size of the initial uplink BWP in "Formula 5" and/or "Formula 6".

That is, in the first case, the UE 100 may specify the first bandwidth part (for example, the initial uplink BWP) based on the first information, and determine the PUCCH resource used for frequency hopping applied to the PUCCH transmission based on the second bandwidth part information. Further, in the first case, the UE 100 may perform the PUCCH transmission with the frequency hopping by using the PUCCH resource determined based on the second bandwidth part information.

In addition, the common configuration information may include information (hereinafter, also referred to as fourth information) indicating the location of the center frequency of the uplink BWP used (assumed) to determine the PUCCH resource (that is, the PRB index of the PUCCH resource). For example, the UE 100 may assume (specify) the uplink BWP (for example, the frequency location of the uplink BWP) based on the fourth information and determine the PUCCH resource from the assumed uplink BWP. For example, the fourth information may include information for indicating locations (for example, a location of a first center frequency and a location of a second center frequency) of a plurality of center frequencies with respect to the assumed uplink BWP. Here, the location of the first center frequency may be used to determine the first PUCCH resource, and the location of the second center frequency may be used to determine the second PUCCH resource. That is, the UE 100 may determine the PUCCH resource used for the frequency hopping applied to the PUCCH transmission based on the location of the center frequency configured based on the fourth information. In addition, the UE 100 may perform PUCCH transmission with frequency hopping by using the determined PUCCH resource.

In addition, the common configuration information may include information (hereinafter, also referred to as fifth information) used to configure validation or invalidation of the frequency hopping applied to the PUCCH transmission. For example, the fifth information may be configured for the UE 100 in the first case. For example, the controller 140 of the UE 100 may determine whether or not to apply the frequency hopping to the PUCCH transmission based on the fifth information. That is, when it is configured to validate the frequency hopping applied to the PUCCH transmission by using the fifth information, the UE 100 may perform the PUCCH transmission with the frequency hopping. In addition, when it is configured not to validate (that is, invalidate) the frequency hopping applied to the PUCCH transmission by using the fifth information, the UE 100 may perform the PUCCH transmission without the frequency hopping. Here, when the fifth information is not received, the UE 100 may perform the PUCCH transmission without the frequency hopping. That is, a default operation of the UE 100 for the frequency hopping adapted to the PUCCH transmission may be invalid. For example, when the initial uplink BWP is specified based on the first information (in the first case), the default operation of the UE 100 for the frequency hopping adapted to the PUCCH transmission may be invalid. Here, for example, when the initial uplink BWP is specified based on the third information (in the second case to be described later), the default operation of the UE 100 for the frequency hopping adapted to the PUCCH transmission may be valid.

As described above, by defining the default operation of the UE 100 as validity or invalidity, it is not necessary to configure the validity or invalidity of the frequency hopping applied to the PUCCH transmission, and the amount of information exchanged between the base station 200 and the UE 100 can be reduced.

Here, the fifth information may include information used to indicate validity or invalidity of frequency hopping in one slot. Here, the frequency hopping in one slot is also referred to as intra-slot frequency hopping. In addition, the fifth information may include information used to indicate validity or invalidity of frequency hopping between slots. Here, the frequency hopping between the slots is also referred to as inter-slot frequency hopping. For example, the controller 140 of the UE 100 may determine whether or not to apply the intra-slot frequency hopping to the PUCCH transmission based on the validity or invalidity of the intra-slot frequency hopping. In addition, the controller 140 of the UE 100 may determine whether or not to apply the inter-slot frequency hopping to the PUCCH transmission based on the validity or invalidity of the inter-slot frequency hopping. That is, the UE 100 may perform the PUCCH transmission with the intra-slot frequency hopping or the inter-slot frequency hopping based on the fifth information.

Here, the fifth information may be configured for the PUCCH format used for PUCCH transmission. That is, the fifth information may include information used to indicate validity or invalidity of frequency hopping for each PUCCH format. For example, the fifth information may include information indicating validity or invalidity of the frequency hopping applied to the PUCCH transmission using a PUCCH format 0, information indicating validity or invalidity of the frequency hopping applied to the PUCCH transmission using a PUCCH format 1, and the like. In addition, the fifth information may be used to indicate the PUCCH format to which the frequency hopping is applicable. That is, the UE 100 may specify the PUCCH format to which the frequency hopping is applicable based on the fifth information.

The common configuration information may include the first PUCCH configuration information. As described above, the first PUCCH configuration information may indicate a cell-specific parameter related to the PUCCH of the associated BWP. That is, the common configuration information may include the first PUCCH configuration information and the bandwidth part information regarding the associated BWP. Further, the first PUCCH configuration information may include PUCCH configuration common information (pucch-ConfigCommon). Here, the PUCCH configuration common information (pucch-ConfigCommon) may include PUCCH resource common information (for example, pucch-ResourceCommon) that provides the PUCCH resource set.

For example, the UE 100 may perform the following operation when the first PUCCH configuration information is received. That is, when the first PUCCH configuration information is received and the second PUCCH configuration information is not received, the UE 100 may perform the operations described in the following steps S102, (A), (B), (B1), (B2), and/or (C). Here, the operations described in the following steps S102, (A-1), (B-1), (B1-1), (B1-2), and/or (C-1) may be included in the operation of the first operation example.

Step S102:

For example, the UE 100 performs uplink transmission to the base station 200. That is, the communicator 120 of the UE 100 transmits the uplink signal to the base station 200. The radio communicator 220 (receiver 221) of the base station 200 receives the uplink signal from the UE 100. Here, the controller 140 of the UE 100 can perform the following operation. Note that the controller 240 of the base station 200 can perform the operation similar to that of the controller 140 of the UE 100 in order to receive the uplink signal from the UE 100.

(A-1) Specification of Initial Uplink BWP1

The controller 140 of the UE 100 may specify the initial uplink BWP for uplink transmission based on the common configuration information. For example, the controller 140 of the UE 100 may specify the initial uplink BWP1 based on the first information. For example, the controller 140 of the UE 100 may determine the location and/or the size in the frequency domain of the initial uplink BWP1 based on the information indicating the frequency location and/or the size included in the first information. Here, the size may be replaced with a bandwidth. Further, the controller 140 of the UE 100 may determine the subcarrier spacing used in the initial uplink BWP1 based on the information indicating the subcarrier spacing included in the first information.

Here, the controller 140 of the UE 100 may specify the initial uplink BWP1 based on the third information. For example, the controller 140 of the UE 100 may determine the location and/or the size in the frequency domain of the initial uplink BWP1 based on the information indicating the frequency location and/or the size included in the third information. Further, the controller 140 of the UE 100 may determine the subcarrier spacing used in the initial uplink BWP1 based on the information indicating the subcarrier spacing included in the third information.

That is, the UE 100 may specify the initial uplink BWP1 based on the first information or the third information. For example, when the first information is configured, the UE 100 may specify the initial uplink BWP1 based on the first information. Further, when the third information is configured and the first information is not configured, the UE 100 may specify the initial uplink BWP1 based on the third information. As an example, when the first information is not configured, the specific UE 100B may specify the initial uplink BWP1 based on the third information configured for the general UE 100A. That is, when the first bandwidth part used to specify the initial uplink BWP1 is not configured, the specific UE 100B may specify the initial uplink BWP1 based on the initial uplink BWP (that is, the third bandwidth part) used for the general UE 100A.

(B-1) Determination of PUCCH Resource

Further, the controller 140 of the UE 100 may determine the PUCCH resource used for transmission of the PUCCH based on the common configuration information. Here, as described above, the PUCCH resource may include the first PUCCH resource and the second PUCCH resource. Hereinafter, the first PUCCH resource is also referred to as a first PUCCH resource R1. In addition, the second PUCCH resource is also referred to as a second PUCCH resource R2. For example, the first PUCCH resource R1 may be a PUCCH resource mapped inside the specified initial uplink BWP1. In addition, the second PUCCH resource R2 may be a resource hopped (that is, used for frequency hopping applied to PUCCH transmission) in the frequency domain from the first PUCCH resource R1. For example, the second PUCCH resource R2 may be a PUCCH resource mapped outside the specified initial uplink BWP1.

Further, the PUCCH resource may include a third PUCCH resource R3 hopped in the frequency domain from the second PUCCH resource R2, or may include a fourth PUCCH resource R4 hopped in the frequency domain from the third PUCCH resource R3. Here, the first PUCCH resource R1 and the third PUCCH resource R3 may be the same PUCCH resource. That is, the third PUCCH resource R3 may be determined by a method similar to that of the first PUCCH resource R1. In addition, the second PUCCH resource R2 and the fourth PUCCH resource R4 may be the same PUCCH resource. That is, the fourth PUCCH resource R4 may be determined by a method similar to that of the second PUCCH resource R2.

Figure 6:
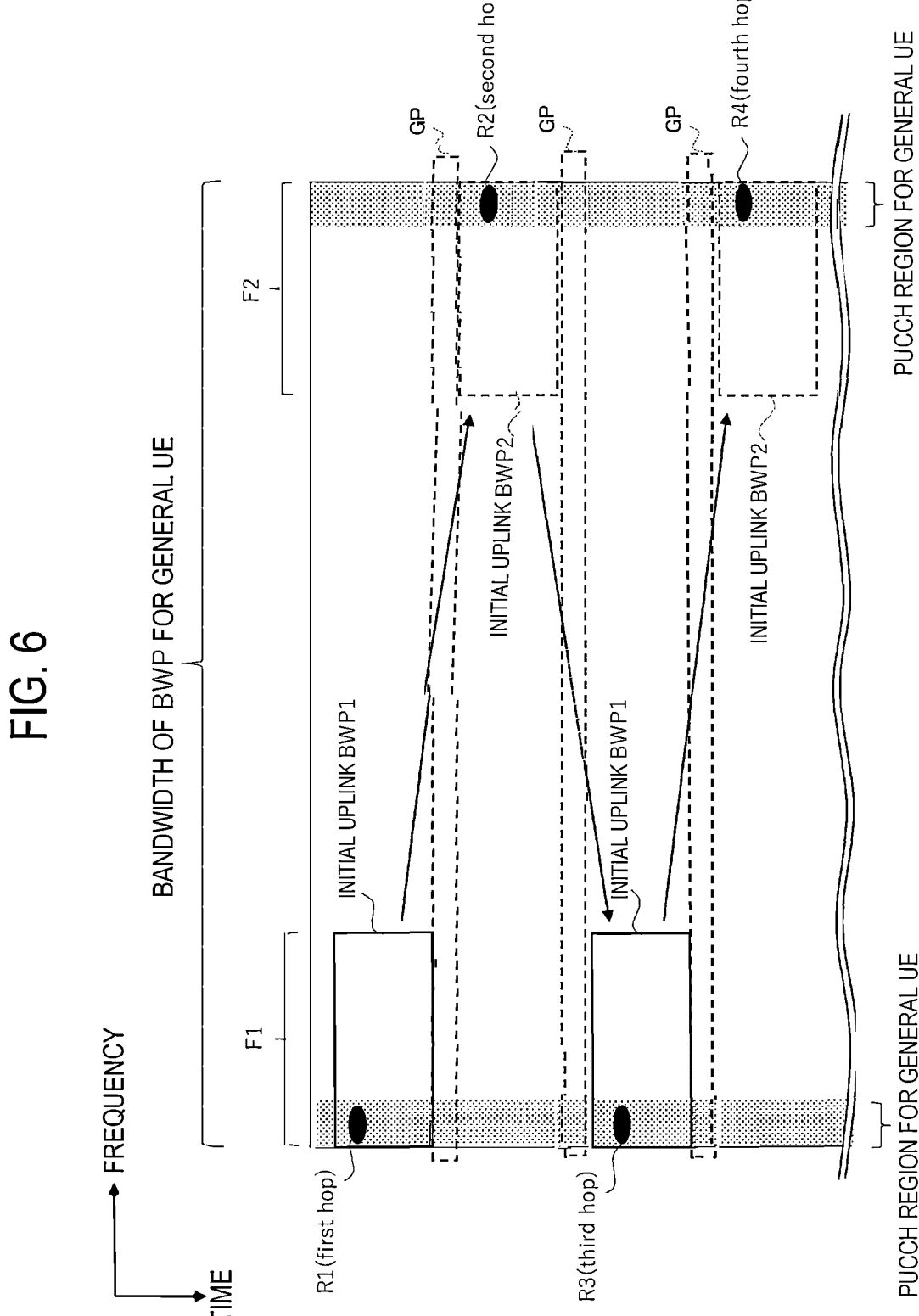
FIG. 6 is a diagram illustrating the first operation example of the mobile communication system according to the embodiment.

Here, as an example, as illustrated in FIG. 6, the PUCCH region for the general UE 100A may be mapped to both ends of the BWP configured for the general UE 100A in the frequency direction. Here, the PUCCH region for the specific UE 100B may be mapped so as to overlap the PUCCH region for the general UE 100A. Specifically, the first PUCCH resource R1 (and the third PUCCH resource R3) may be mapped inside one PUCCH region (hereinafter, the first PUCCH region) in the frequency direction, and the second PUCCH resource R2 (and the fourth PUCCH resource R4) may be mapped inside the other PUCCH region (hereinafter, the second PUCCH region) in the frequency direction.

Note that, because there is a possibility that the bandwidth of the BWP for the specific UE 100B is configured to be narrower than the bandwidth of the BWP for the general UE 100A, for example, when the BWP for the specific UE 100B overlaps the first PUCCH region, the BWP does not need to overlap the second PUCCH region.

(B1-1) Case Where Initial Uplink BWP1 is Specified Based on First Information (Hereinafter, Also Referred to as First Case)

In the first case, the controller 140 of the UE 100 may specify (assume) an uplink BWP different from the initial uplink BWP1 based on the second bandwidth part information. Hereinafter, for clarity of description, the uplink BWP specified (assumed) based on the second bandwidth part information is also referred to as an initial uplink BWP2. That is, the initial uplink BWP2 may be replaced with the uplink BWP. That is, the controller 140 of the UE 100 may specify (assume) the initial uplink BWP2 used to determine the PUCCH resource based on the second bandwidth part information. For example, the initial uplink BWP1 may be assumed to be located in a first frequency band F1, and the initial uplink BWP2 may be assumed to be located in a second frequency band F2. Here, the initial uplink BWP2 may be defined as an uplink BWP used only for performing the PUCCH transmission. In addition, the initial uplink BWP2 may be defined as an uplink BWP used for performing the PUSCH transmission in addition to the PUCCH transmission. For example, when the initial uplink BWP2 is defined as the uplink BWP used for performing the PUSCH transmission, the UE 100 may perform the PUCCH transmission and/or the PUSCH transmission by switching the initial uplink BWP from the initial uplink BWP1 to the initial uplink BWP2.

That is, in the first case, the controller 140 of the UE 100 may specify the initial uplink BWP1 based on the first information, and may determine at least the second PUCCH resource R2 based on the second bandwidth part information. Further, in the first case, the controller 140 of the UE 100 may determine the first PUCCH resource R1 based on the first information, and may determine the second PUCCH resource R2 based on the second bandwidth part information. For example, the controller 140 of the UE 100 may determine the first PUCCH resource R1 (PRB index of the PUCCH resource on the first hop, that is, the first PUCCH resource R1) based on the above-described "Determination of PUCCH Resource (that is, the method for determining the PUCCH resource by using one or more of the "formula 1" to the "formula 7")". Further, the controller 140 of the UE 100 may determine the second PUCCH resource R2 (PRB index of the PUCCH resource on the second hop, that is, the second PUCCH resource R2) based on the above-described "Determination of PUCCH Resource". That is, for example, the controller 140 of the UE 100 may specify the frequency location, the size, and/or the subcarrier spacing with respect to the initial uplink BWP2 based on the second bandwidth part information. That is, the controller 140 of the UE 100 may determine the first PUCCH resource R1 and/or the second PUCCH resource R2 according to one or more of the "formula 1" to the "formula 7" based on the specified frequency location, size, and/or subcarrier spacing.

Further, the controller 140 of the UE 100 may determine the first PUCCH resource R1 and/or the second PUCCH resource R2 based on the fourth information. For example, the controller 140 of the UE 100 may determine the first PUCCH resource R1 based on the information indicating the location of the center frequency with respect to the initial uplink BWP1. Further, the controller 140 of the UE 100 may determine the second PUCCH resource R2 based on the information indicating the location of the center frequency with respect to the initial uplink BWP2.

As described above, the controller 140 of the UE 100 may determine the second PUCCH resource R2 based on the information indicating the subcarrier spacing included in the second bandwidth part information. Here, the controller 140 of the UE 100 may determine the first PUCCH resource R1 and/or the second PUCCH resource R2 based on the information indicating the subcarrier spacing included in the first information. For example, when the information indicating the subcarrier spacing is not had in the second bandwidth part information, the controller 140 of the UE 100 may determine the first PUCCH resource R1 and/or the second PUCCH resource R2 based on the information indicating the subcarrier spacing included in the first information.

(B2-1) Case Where Initial Uplink BWP1 is Specified Based on Third Information (Hereinafter, Also Referred to as Second Case)

In the second case, the controller 140 of the UE 100 may specify (assume) the initial uplink BWP2 based on the third information. For example, the controller 140 of the UE 100 may specify (assume) the uplink BWP (that is, the initial uplink BWP2) by using a method similar to the method for specifying the initial uplink BWP1 based on the third information.

That is, in the second case, the controller 140 of the UE 100 may assume (specify) the initial uplink BWP1 and/or the initial uplink BWP2 based on the third information, and may determine the first PUCCH resource R1. In addition, the controller 140 of the UE 100 may assume (specify) the initial uplink BWP1 and/or the initial uplink BWP2 based on the third information, and may determine the second PUCCH resource R2. For example, similarly to the first case, even in the second case, the controller 140 of the UE 100 may determine the first PUCCH resource R1 and/or the second PUCCH resource R2 based on the above-described "Determination of PUCCH Resource (that is, the method for determining the PUCCH resource by using one or more of the "formula 1" to the "formula 7")". Similarly to the first case, even in the second case, the controller 140 of the UE 100 may determine the first PUCCH resource R1 and/or the second PUCCH resource R2 based on the fourth information.

Here, in the second case, the controller 140 of the UE 100 may assume that the frequency hopping is always applied to the PUCCH transmission. That is, in the second case, the frequency hopping applied to the PUCCH transmission may be always valid. That is, the default operation of the UE 100 for the frequency hopping applied to the PUCCH transmission in the second case may be valid. Here, as described above, the default operation of the UE 100 for the frequency hopping applied to the PUCCH transmission in the first case may be valid.

That is, when the first information is received (that is, when the uplink BWP (for example, the initial uplink BWP) is specified based on the first information), the UE 100 may invalidate the default operation for the frequency hopping applied to the PUCCH transmission (it may configure the default operation to be invalid). In addition, when the third information is received and the first information is not received (that is, when the uplink BWP (for example, the initial uplink BWP) is specified based on the third information), the UE 100 may validate the default operation for the frequency hopping applied to the PUCCH transmission (it may configure the default operation to be valid).

(C-1) Guard Duration

The controller 140 of the UE 100 may configure a guard duration GP in a case of performing the uplink transmission by applying the frequency hopping. Here, the configuration may also be replaced with generation. That is, for example, the controller 140 of the UE 100 may determine the number of symbols used in the guard duration GP in a case of performing the uplink transmission by applying the frequency hopping. For example, the controller 140 of the UE 100 may determine the number of symbols for configuring the guard duration GP in a case of performing the uplink transmission in the first frequency band F1 and then performing the uplink transmission in the second frequency band F2 different from the first frequency band F1. That is, the controller 140 of the UE 100 may determine the number of symbols for configuring the guard duration GP in a case of changing (switching) the frequency band from the first frequency band F1 to the second frequency band F2. Here, even in a case of changing (switching) the frequency band from the second frequency band F2 to the first frequency band F1, the controller 140 of the UE 100 may determine the number of symbols for configuring the guard duration GP. Hereinafter, determining the number of symbols for configuring the guard duration GP is also simply referred to as generating (configuring) the guard duration GP.

Here, in the present embodiment, the first frequency band F1 and/or the second frequency band F2 may include a bandwidth part (BWP). That is, the first frequency band F1 and/or the second frequency band F2 may include a downlink bandwidth part (downlink BWP and initial downlink BWP). In addition, the first frequency band F1 and/or the second frequency band F2 may include an uplink bandwidth part (uplink BWP and initial uplink BWP). That is, changing (switching) the frequency band may include changing (switching) the bandwidth part (BWP). In addition, changing (switching) the frequency band may include retuning the frequency of the bandwidth part (BWP). The first frequency band F1 is also referred to as a first frequency band. The second frequency band F2 is also referred to as a second frequency band.

For example, the controller 140 of the UE 100 may generate the guard duration GP in a case where the first frequency band F1 and the second frequency band F2 are not located within one BWP used by the UE 100 for the uplink transmission. In addition, the controller 140 of the UE 100 may generate the guard duration GP in a case where the two consecutive transmissions are the uplink transmission in the first frequency band F1 and the uplink transmission in the second frequency band F2. That is, the controller 140 of the UE 100 may generate the guard duration GP in a case of changing (switching) or retuning the frequency by transmission in different frequency bands.

For example, the controller 140 of the UE 100 may generate the guard duration GP based on the subcarrier spacing of the uplink BWP. That is, the controller 140 of the UE 100 may generate the guard duration GP based on the information indicating the subcarrier spacing included in the first information. In addition, the controller 140 of the UE 100 may generate the guard duration GP based on the information indicating the subcarrier spacing included in the second bandwidth part information. In addition, the controller 140 of the UE 100 may generate the guard duration GP based on the information indicating the subcarrier spacing included in the third information.

That is, the UE 100 may generate the guard duration GP based on the information indicating the subcarrier spacing included in the first information, the information indicating the subcarrier spacing included in the second bandwidth part information, or the information indicating the subcarrier spacing included in the third information. For example, when the information indicating the subcarrier spacing included in the second bandwidth part information is configured, the UE 100 may generate the guard duration GP based on the information indicating the subcarrier spacing included in the second bandwidth part information. Further, when the information indicating the subcarrier spacing included in the first information is configured and the information indicating the subcarrier spacing included in the second bandwidth part information is not configured, the UE 100 may generate the guard duration GP based on the information indicating the subcarrier spacing included in the first information. Further, when the information indicating the subcarrier spacing included in the third information is configured and the information indicating the subcarrier spacing included in the first information is not configured, the UE 100 may generate the guard duration GP based on the information indicating the subcarrier spacing included in the third information. Further, when the information indicating the subcarrier spacing included in the third information is configured and the information indicating the subcarrier spacing included in the second bandwidth part information is not configured, the UE 100 may generate the guard duration GP based on the information indicating the subcarrier spacing included in the third information.

As described above, the number of slots forming one subframe may change based on the subcarrier spacing configured by the base station 200. That is, the number of symbols forming one subframe may change based on the subcarrier spacing configured by the base station 200. For example, the number of symbols forming the subframe of 1 ms is determined based on the subcarrier spacing configured by the base station 200, and the length (length in the time direction) of each symbol changes. That is, the length (length in the time direction) of the symbol included in the guard duration GP may change based on the subcarrier spacing configured by the base station 200. That is, the length (the length in the time direction) of the symbol corresponding to the length of the guard duration GP may be given based on the subcarrier spacing configured by the base station 200. Here, the subcarrier spacing configured by the base station 200 includes the subcarrier spacing configured based on the information indicating the subcarrier spacing included in the first information, the subcarrier spacing configured based on the information indicating the subcarrier spacing included in the first information, and/or subcarrier spacing configured based on the information indicating the subcarrier spacing included in the third information.

Here, when the subcarrier spacing is different in the two frequency bands, the controller 140 of the UE 100 may determine the number of symbols in each of the two frequency bands. That is, for example, the controller 140 of the UE 100 may cause the number of symbols in the frequency band having the wide subcarrier spacing to be larger than the number of symbols in the frequency band having the narrow subcarrier spacing. In addition, the controller 140 of the UE 100 may configure the total duration of the lengths of the number of symbols determined in each of the two frequency bands as the length of the guard duration GP. In addition, the controller 140 of the UE 100 may configure, as the length of the guard duration GP, the larger one (that is, the longer guard duration GP) of the number of symbols determined in each of the two frequency bands. In addition, the controller 140 of the UE 100 may configure, as the length of the guard duration GP, the smaller one (that is, the shorter guard duration GP) of the number of symbols determined in each of the two frequency bands.

Here, the number of symbols corresponding to the guard duration GP may be determined according to the capability of the UE 100. That is, the controller 140 of the UE 100 may store capability information (for example, UE capability information) indicating the capability of the UE 100. The controller 140 of the UE 100 may determine the number of symbols based on the capability information of the UE 100. For example, when the capability information indicates Capability 1, the controller 140 of the UE 100 may determine the length of the guard duration to be 1 symbol. In addition, when the capability information indicates Capability 2, the controller 140 of the UE 100 may determine the length of the guard duration to be 2 symbols.

Further, for example, the communicator 120 of the UE 100 may transmit information used to specify the number of symbols corresponding to the guard duration GP to the base station 200 as the capability information. That is, the communicator 120 of the UE 100 may transmit the capability information corresponding to the number of symbols to the base station 200. Here, the capability information may be any information as long as the information is used for the number of symbols corresponding to the guard duration GP.

Further, for example, the controller 240 of the base station 200 may specify the length (that is, the number of symbols) of the guard duration GP generated by the UE 100 based on the capability information of the UE 100. Further, the controller 240 of the base station 200 may specify a duration in which the uplink transmission is not performed by the UE 100 based on the length of the guard duration GP (that is, the number of symbols).

In addition, the controller 140 of the UE 100 generates the guard duration GP corresponding to the determined number of symbols. For example, the controller 140 of the UE 100 may perform control so as not to perform the uplink transmission within the guard duration GP. Here, the uplink transmission includes at least PUSCH transmission and/or PUCCH transmission.

As illustrated in FIGS. 5 and 6, the communicator 120 of the UE 100 transmits the PUCCH using the determined PUCCH resource. That is, the communicator 120 of the UE 100 performs PUCCH transmission with frequency hopping using the determined PUCCH resource. Specifically, the communicator 120 of the UE 100 performs the PUCCH transmission with the frequency hopping using the first PUCCH resource R1 and/or the second PUCCH resource R2. For example, the communicator 120 of the UE 100 may transmit HARQ-ACK to Msg.4 (that is, the PDSCH) using the PUCCH.

Here, after performing PUCCH transmission using the first PUCCH resource R1, the controller 140 of the UE 100 changes the frequency band from the first frequency band F1 to the second frequency band F2. This change may be retuning of the frequency band or switching of the frequency band. For example, the controller 140 of the UE 100 may perform retuning or switching from the first frequency band F1 to the second frequency band F2 within the generated guard duration GP. Here, it is assumed that the first PUCCH resource R1 is mapped to the first frequency band F1. Further, it is assumed that the second PUCCH resource R2 is mapped to the second frequency band F2.

After changing the frequency band to the second frequency band, the communicator 120 of the UE 100 performs PUCCH transmission using the second PUCCH resource R2. For example, the controller 140 of the UE 100 may perform retuning or switching from the second frequency band F2 to the first frequency band F1 within the generated guard duration GP.

Similarly, the communicator 120 of the UE 100 performs PUCCH transmission using the third PUCCH resource R3 after changing the frequency band to the first frequency band. For example, the controller 140 of the UE 100 may perform retuning or switching from the first frequency band F1 to the second frequency band F2 within the generated guard duration GP. After changing the frequency band to the second frequency band, the communicator 120 of the UE 100 performs the PUCCH transmission using the fourth PUCCH resource R4. For example, the controller 140 of the UE 100 may perform retuning or switching from the second frequency band F2 to the first frequency band F1 within the generated guard duration GP.

(2) Second Operation Example

Figure 7:
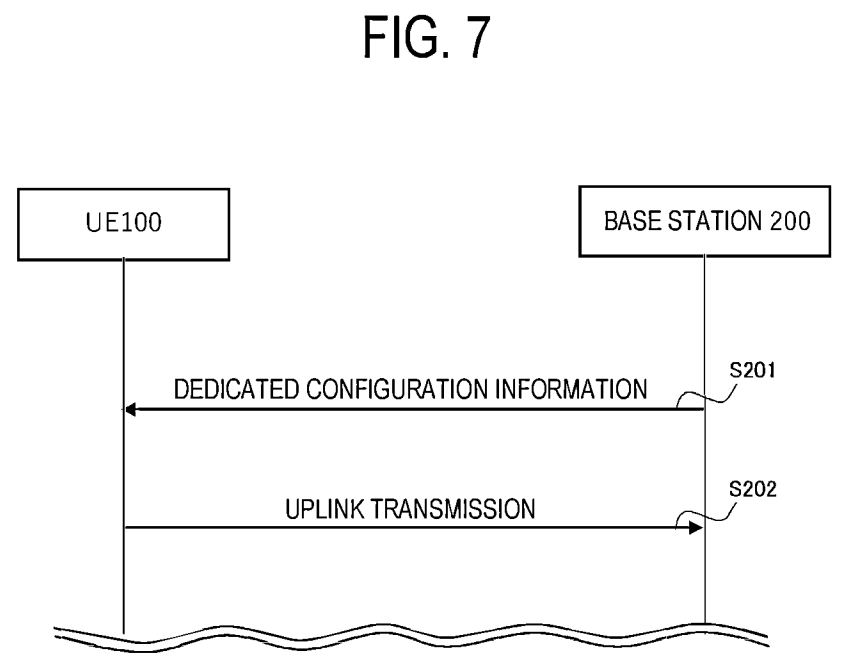
Figure 8:
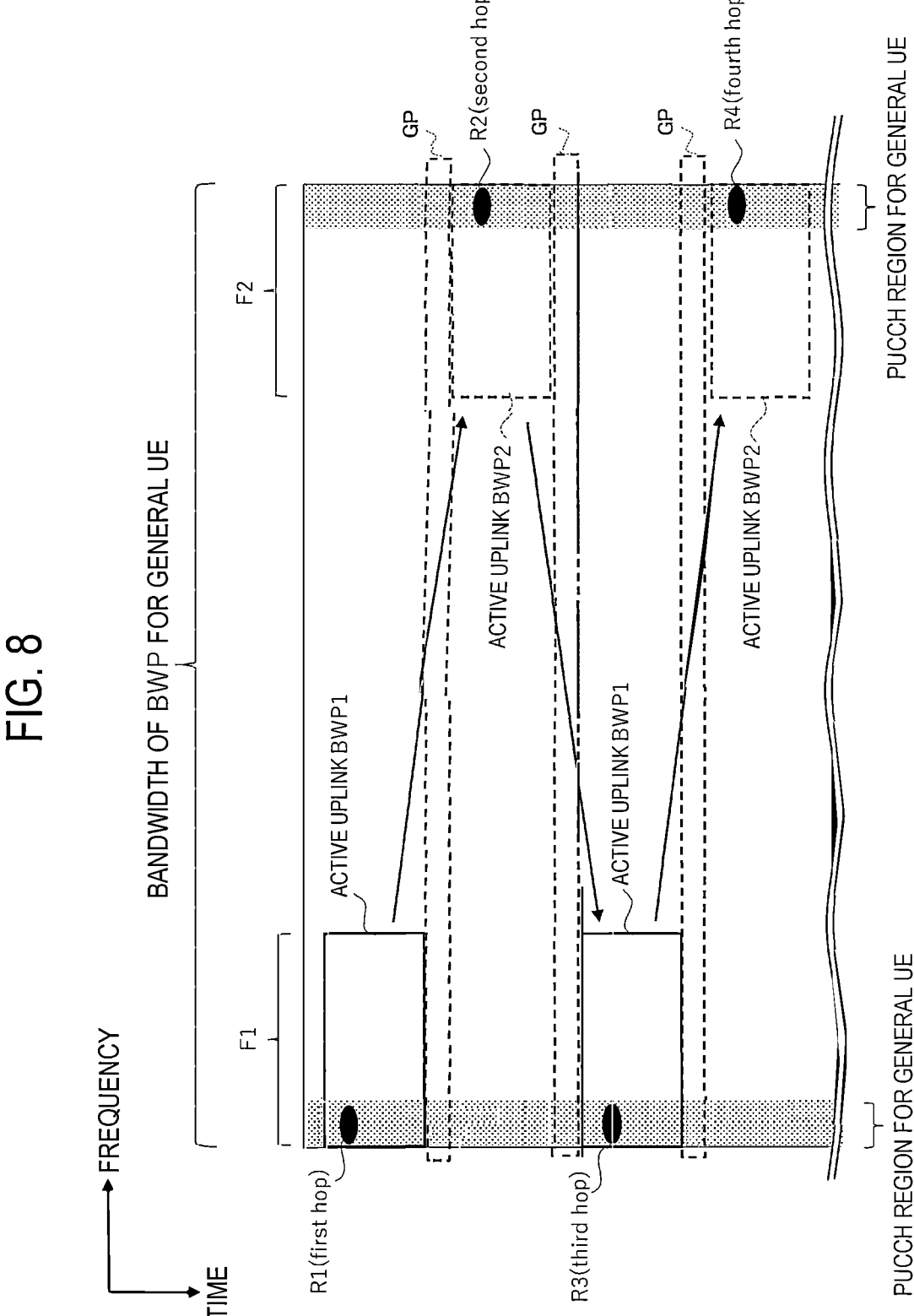
FIG. 8 is a diagram illustrating the second operation example of the mobile communication system according to the embodiment.

With reference to FIGS. 7 and 8, a second operation example will be described focusing on differences from the above-described operation example. In the second operation example, the UE 100 performs PUCCH transmission based on the dedicated configuration information. In FIG. 7, the UE 100 may be in an RRC connected state between the UE 100 and the base station 200. For example, in FIG. 7, the UE 100 may be in a state in the second case. In addition, in FIG. 7, the UE 100 may be in a state after performing the initial access. In addition, in FIG. 7, the UE 100 may be in a state after receiving the RRC setup message, the RRC resume message, and/or the RRC (re) establishment message. For example, in FIG. 7, the UE 100 may transmit HARQ-ACK for downlink user data (that is, the PDSCH).
Step S201:

The radio communicator 220 of the base station 200 transmits dedicated configuration information including a dedicated parameter for uplink transmission to the UE 100. The communicator 120 of the UE 100 receives the dedicated configuration information from the base station 200.

The radio communicator 220 transmits the dedicated configuration information by unicast. The radio communicator 220 may transmit, for example, an RRC reconfiguration message including dedicated configuration information. That is, the dedicated configuration information may be a UE-specific parameter.

For example, the dedicated configuration information may be configuration information (specifically, UplinkConfig) included in serving cell configuration information (specifically, ServingCellConfig) used to configure (add or change) the UE 100 in the serving cell managed by the base station 200. For example, the dedicated configuration information may include information similar to the information included in the common configuration information in the first operation example. For example, the dedicated configuration information may include at least one of bandwidth part information (first information, second bandwidth part information, and/or third information), information indicating the location of the center frequency with respect to the uplink BWP (fourth information), and information indicating the validity or invalidity of the frequency hopping applied to the PUCCH transmission (fifth information). Here, the information included in the dedicated configuration information may be configured for the active uplink BWP. For example, the UE 100 may specify (or assume) the active uplink BWP based on the first information, the second bandwidth part information, and/or the third information. In addition, the UE 100 may determine the location of the center frequency with respect to the active uplink BWP based on the fourth information. In addition, the UE 100 may determine the validity or invalidity of the frequency hopping applied to the PUCCH transmission in the active uplink BWP based on the fourth information.

For example, the dedicated configuration information may include second PUCCH configuration information. As described above, the second PUCCH configuration information may be a PUCCH configuration for one BWP in the normal uplink of the serving cell. That is, the second PUCCH configuration information may indicate a UE specific parameter (UE space parameter). That is, the dedicated configuration information may include the second PUCCH configuration information, the identifier of the BWP associated with the second PUCCH configuration information, and the bandwidth part information associated with the identifier of the BWP.

For example, when the second PUCCH configuration information is received, the UE 100 may perform the operation described in the following steps S202, (A-2), (B-2), (B2-1), (B2-2), and/or (C-2). Here, as described above, the UE 100 may execute the operation of the first operation example in a case where the first PUCCH configuration information is received and the second PUCCH configuration information is not received.
Step S202:

For example, the UE 100 performs uplink transmission to the base station 200. That is, the communicator 120 of the UE 100 transmits the uplink signal to the base station 200. The radio communicator 220 of the base station 200 receives the uplink signal from the UE 100. Here, the controller 140 of the UE 100 can perform the following operation. Note that the controller 240 of the base station 200 can perform the operation similar to that of the controller 140 of the UE 100 in order to receive the uplink signal from the UE 100.
(A-2) Specification of Uplink BWP1

The controller 140 of the UE 100 may specify the uplink BWP (active uplink BWP) for uplink transmission based on the dedicated configuration information. For example, the controller 140 of the UE 100 may specify the active uplink BWP by any one of the following methods.

For example, the controller 140 of the UE 100 may specify the active uplink BWP1 based on the first information. For example, the controller 140 of the UE 100 may determine the location and/or the size in the frequency domain of the active uplink BWP1, based on the information indicating the frequency location and/or the size included in the first information. Here, the size may be replaced with a bandwidth. In addition, the controller 140 of the UE 100 may determine the subcarrier spacing used in the active uplink BWP1, based on the information indicating the subcarrier spacing included in the first information.

Here, the controller 140 of the UE 100 may specify the active uplink BWP1 based on the third information. For example, the controller 140 of the UE 100 may determine the location and/or the size in the frequency domain of the active uplink BWP1, based on the information indicating the frequency location and/or the size included in the third information. In addition, the controller 140 of the UE 100 may determine the subcarrier spacing used in the active uplink BWP1, based on the information indicating the subcarrier spacing included in the third information.

That is, the UE 100 may specify the active uplink BWP1 based on the first information or the third information. For example, when the first information is configured, the UE 100 may specify the active uplink BWP1 based on the first information. In addition, when the third information is configured and the first information is not configured, the UE 100 may specify the active uplink BWP1 based on the third information. As an example, when the first information is not configured, the specific UE 100B may specify the active uplink BWP1 based on the third information configured for the general UE 100A. That is, when the first bandwidth part used to specify the active uplink BWP1 is not configured, the specific UE 100B may specify the active uplink BWP1 based on the initial uplink BWP (that is, the third bandwidth part) used for the general UE 100A.

Note that, when a plurality of uplink BWPs are configured, the controller 140 of the UE 100 may specify the active BWP from the plurality of uplink BWPs, based on the identifier indicating the BWP to be used first in communication with the base station 200.

Note that, in the second operation example, the active uplink BWP1 and the active uplink BWP2 are targeted instead of the initial uplink BWP1 and the initial uplink BWP2. Therefore, in a part similar to the first operation example, the initial uplink BWP1 can be replaced with the active uplink BWP1, and the initial uplink BWP2 can be replaced with the active uplink BWP2.

(B-2) Determination of PUCCH Resource

Further, the controller 140 of the UE 100 may determine the PUCCH resource to be used for transmission of the PUCCH based on the dedicated configuration information. Here, similarly to the first operation example, the PUCCH resource includes a first PUCCH resource R1 and a second PUCCH resource R2. Further, the first PUCCH resource R1 may be a PUCCH resource mapped inside the specified active uplink BWP1. In addition, the second PUCCH resource R2 may be a resource hopped (that is, used for frequency hopping applied to PUCCH transmission) in the frequency domain from the first PUCCH resource R1. For example, the second PUCCH resource R2 may be a PUCCH resource mapped outside the specified active uplink BWP1.

(B2-1) Case Where Active Uplink BWP1 is Specified Based on First Information (Hereinafter, Also Referred to as Third Case)

In the third case, the controller 140 of the UE 100 may specify (assume) the active uplink BWP2 different from the active uplink BWP1 based on the second bandwidth part information. Hereinafter, for clarity of description, the uplink BWP specified (assumed) based on the second bandwidth part information is also referred to as an active uplink BWP2. That is, the active uplink BWP2 may be replaced with the uplink BWP. That is, the controller 140 of the UE 100 may specify (assume) the active uplink BWP2 used to determine the PUCCH resource based on the second bandwidth part information. For example, it may be assumed that the active uplink BWP1 is located in the first frequency band F1, and the active uplink BWP2 is located in the second frequency band F2. Here, the active uplink BWP2 may be defined as an active uplink BWP used only for performing PUCCH transmission. Further, the active uplink BWP2 may be defined as an uplink BWP used for performing PUSCH transmission in addition to the PUCCH transmission. For example, when the active uplink BWP2 is defined as an uplink BWP used for performing the PUSCH transmission, the UE 100 may perform the PUCCH transmission and/or the PUSCH transmission by switching the active uplink BWP from the active uplink BWP1 to the active uplink BWP2.

That is, in the third case, the controller 140 of the UE 100 may specify the active uplink BWP1 based on the first information, and may determine at least the second PUCCH resource R2 based on the second bandwidth part information.

In addition, in the third case, the controller 140 of the UE 100 may determine the first PUCCH resource R1 based on the first information, and may determine the second PUCCH resource R2 based on the second bandwidth part information. Further, the controller 140 of the UE 100 may determine the first PUCCH resource R1 and/or the second PUCCH resource R2 based on the fourth information. For example, the controller 140 of the UE 100 may determine the first PUCCH resource R1 based on the information indicating the location of the center frequency with respect to the active uplink BWP1. Further, the controller 140 of the UE 100 may determine the second PUCCH resource R2 based on the information indicating the location of the center frequency with respect to the active uplink BWP1. Further, the controller 140 of the UE 100 may determine the second PUCCH resource R2 based on the information indicating the subcarrier spacing included in the second bandwidth part information. Here, the controller 140 of the UE 100 may determine the first PUCCH resource R1 and/or the second PUCCH resource R2 based on the information indicating the subcarrier spacing included in the first information. For example, the information indicating the subcarrier spacing is not had in the second bandwidth part information, the controller 140 of the UE 100 may determine the first PUCCH resource R1 and/or the second PUCCH resource R2 based on the information indicating the subcarrier spacing included in the first information.

Here, as described above, in the second case, the UE 100 may determine the PUCCH resource (that is, the PRB index of the PUCCH resource) used for the frequency hopping applied to the PUCCH transmission based on the starting PRB information and/or the second hop PRB information. That is, in the second case, the base station 200 may designate the PUCCH resource (that is, the PRB index of the PUCCH resource) used for frequency hopping applied to the PUCCH transmission by using the starting PRB information and/or the second hop PRB information. Here, as described above, the physical resource block (PRB) with the subcarrier spacing configuration μ is defined in the bandwidth part and numbered from 0 to the following number (PRB number and PRB index). That is, the PUCCH resource (that is, the PRB index of the PUCCH resource) designated by the starting PRB information and/or the second hop PRB information corresponds to the PRB index numbered according to the "formula 1". That is, the frequency location and/or size of the uplink BWP (active uplink BWP) is used to specify the PUCCH resource (that is, the PRB index of the PUCCH resource) designated by the starting PRB information and/or the second hop PRB information. In addition, the subcarrier spacing of the uplink BWP (active uplink BWP) is used to specify the PUCCH resource (that is, the PRB index of the PUCCH resource) designated by the starting PRB information and/or the second hop PRB information.

For example, in the third case, the controller 140 of the UE 100 may determine the frequency location and/or the size of the uplink BWP (active uplink BWP) based on the information indicating the frequency location and/or the size included in the second bandwidth part information. In addition, in the third case, the controller 140 of the UE 100 may determine the subcarrier spacing of the uplink BWP (active uplink BWP) based on the information indicating the subcarrier spacing included in the second bandwidth part information.

That is, the controller 140 of the UE 100 may use the frequency location and/or the size configured based on the information indicating the frequency location and/or the size included in the second bandwidth part information in order to determine the PRB index of the first PUCCH resource R1 designated by using the starting PRB information. In addition, the controller 140 of the UE 100 may use the subcarrier spacing configured based on the information indicating the subcarrier spacing included in the second bandwidth part information in order to determine the PRB index of the first PUCCH resource R1 designated by using the starting PRB information. Further, the controller 140 of the UE 100 may use the frequency location and/or the size configured based on the information indicating the frequency location and/or the size included in the second bandwidth part information in order to determine the PRB index of the second PUCCH resource R2 designated by using the second hop PRB information. Further, the controller 140 of the UE 100 may use the subcarrier spacing configured based on the information indicating the subcarrier spacing included in the second bandwidth part information in order to determine the PRB index of the second PUCCH resource R2 designated by using the second hop PRB information.

Further, in the third case, the controller 140 of the UE 100 may determine the frequency location and/or the size of the uplink BWP (active uplink BWP) based on the information indicating the frequency location and/or the size included in the first information. For example, in a case where the information indicating the frequency location and/or the size included in the first information is configured and the information indicating the frequency location and/or the size included in the second bandwidth part information is not configured, the controller 140 of the UE 100 may determine the frequency location and/or the size of the uplink BWP (active uplink BWP) based on the information indicating the frequency location and/or the size included in the first information.

Further, in the third case, the controller 140 of the UE 100 may determine the subcarrier spacing of the uplink BWP (active uplink BWP) based on the information indicating the subcarrier spacing included in the first information. For example, in a case where the information indicating the subcarrier spacing included in the first information is configured and the information indicating the subcarrier spacing included in the second bandwidth part information is not configured, the controller 140 of the UE 100 may determine the subcarrier spacing of the uplink BWP (active uplink BWP) based on the information indicating the subcarrier spacing included in the first information.

That is, the controller 140 of the UE 100 may use the frequency location and/or the size configured based on the information indicating the frequency location and/or the size included in the first information in order to determine the PRB index of the first PUCCH resource R1 designated by using the starting PRB information. In addition, the controller 140 of the UE 100 may use the subcarrier spacing configured based on the information indicating the subcarrier spacing included in the first information in order to determine the PRB index of the first PUCCH resource R1 designated by using the starting PRB information. Further, the controller 140 of the UE 100 may use the frequency location and/or the size configured based on the information indicating the frequency location and/or the size included in the first information in order to determine the PRB index of the second PUCCH resource R2 designated by using the second hop PRB information. Further, the controller 140 of the UE 100 may use the subcarrier spacing configured based on the information indicating the subcarrier spacing included in the first information in order to determine the PRB index of the second PUCCH resource R2 designated by using the second hop PRB information.

(B2-2) Case Where Active Uplink BWP1 is Specified Based on Third Information (Hereinafter, Also Referred to as Fourth Case)

In the fourth case, the controller 140 of the UE 100 may specify (assume) the active uplink BWP2 based on the third information. For example, the controller 140 of the UE 100 may specify (assume) the uplink BWP (that is, the active uplink BWP2) using a method similar to the method for specifying the active uplink BWP1 based on the third information.

Here, when the active uplink BWP1 is specified based on the third information, the controller 140 of the UE 100 may determine the first PUCCH resource R1 and/or the second PUCCH resource R2 based on the third information.

For example, in the fourth case, the controller 140 of the UE 100 may determine the frequency location and/or the size of the uplink BWP (active uplink BWP) based on the information indicating the frequency location and/or the size included in the third information. Further, in the fourth case, the controller 140 of the UE 100 may determine the subcarrier spacing of the uplink BWP (active uplink BWP) based on the information indicating the subcarrier spacing included in the third information. That is, the controller 140 of the UE 100 may use the frequency location and/or the size configured based on the information indicating the frequency location and/or the size included in the third information in order to determine the PRB index of the first PUCCH resource R1 designated by using the starting PRB information. Further, the controller 140 of the UE 100 may use the subcarrier spacing configured based on the information indicating the subcarrier spacing included in the third information in order to determine the PRB index of the first PUCCH resource R1 designated by using the starting PRB information. Further, the controller 140 of the UE 100 may use the frequency location and/or the size configured based on the information indicating the frequency location and/or the size included in the third information in order to determine the PRB index of the second PUCCH resource R2 designated by using the second hop PRB information. Further, the controller 140 of the UE 100 may use the subcarrier spacing configured based on the information indicating the subcarrier spacing included in the third information in order to determine the PRB index of the second PUCCH resource R2 designated by using the second hop PRB information.

For example, in a case where the information indicating the frequency location and/or the size included in the third information is configured and the information indicating the frequency location and/or the size included in the first information is not configured, the controller 140 of the UE 100 may determine the frequency location and/or the size of the uplink BWP (active uplink BWP) based on the information indicating the frequency location and/or the size included in the third information. Further, in a case where the information indicating the subcarrier spacing included in the third information is configured and the information indicating the subcarrier spacing included in the first information is not configured, the controller 140 of the UE 100 may determine the subcarrier spacing of the uplink BWP (active uplink BWP) based on the information indicating the subcarrier spacing included in the third information.

Further, in a case where the information indicating the frequency location and/or the size included in the third information is configured and the information indicating the frequency location and/or the size included in the second bandwidth part information is not configured, the controller 140 of the UE 100 may determine the frequency location and/or the size of the uplink BWP (active uplink BWP) based on the information indicating the frequency location and/or the size included in the third information. Further, when the information indicating the subcarrier spacing included in the third information is configured and the information indicating the subcarrier spacing included in the second bandwidth part information is not configured, the controller 140 of the UE 100 may determine the subcarrier spacing of the uplink BWP (active uplink BWP) based on the information indicating the subcarrier spacing included in the third information.

(C-2) Guard Duration

Similarly to the first operation example, when the uplink transmission is performed in the first frequency band F1 and then the uplink transmission is performed in the second frequency band F2 different from the first frequency band F1, the controller 140 of the UE 100 may determine the number of symbols for configuring the guard duration GP in a case of changing (switching) the frequency band from the first frequency band F1 to the second frequency band F2. For example, when the PUCCH transmission is performed based on the dedicated configuration information, the controller 140 of the UE 100 may generate the guard duration GP based on the dedicated configuration information.

For example, the controller 140 of the UE 100 may determine the number of symbols configuring the guard duration GP based on the subcarrier spacing of the active uplink BWP. In addition, the controller 140 may determine the number of symbols according to the capability of the UE 100. That is, the communicator 120 of the UE 100 may transmit information used to specify the number of symbols corresponding to the guard duration GP to the base station 200 as the capability information. Here, the uplink transmission includes at least PUSCH transmission and/or PUCCH transmission.

In addition, the controller 140 of the UE 100 generates the guard duration GP corresponding to the determined number of symbols. For example, the controller 140 of the UE 100 may perform control so as not to perform the uplink transmission within the guard duration GP.

As illustrated in FIGS. 7 and 8, the communicator 120 of the UE 100 transmits the PUCCH using the determined PUCCH resource. That is, the communicator 120 of the UE 100 performs PUCCH transmission with frequency hopping using the determined PUCCH resource. Specifically, the communicator 120 of the UE 100 performs the PUCCH transmission with the frequency hopping using the first PUCCH resource R1 and/or the second PUCCH resource R2. For example, the communicator 120 of the UE 100 may transmit HARQ-ACK for the downlink user data (that is, the PDSCH) using the PUCCH.

Here, after performing PUCCH transmission using the first PUCCH resource R1, the controller 140 of the UE 100 changes the frequency band from the first frequency band F1 to the second frequency band F2. For example, the controller 140 of the UE 100 may perform retuning or switching from the first frequency band F1 to the second frequency band F2 within the generated guard duration GP. After changing the frequency band to the second frequency band, the communicator 120 of the UE 100 performs PUCCH transmission using the second PUCCH resource R2. For example, the controller 140 of the UE 100 may perform retuning or switching from the second frequency band F2 to the first frequency band F1 within the generated guard duration GP. Similarly, the communicator 120 of the UE 100 performs PUCCH transmission using the third PUCCH resource R3 and/or the fourth PUCCH resource R4 while changing the frequency band between the first frequency band F1 and the second frequency band F2.

Other Embodiments

In the above-described operation example, the generation of the guard duration for the case where the UE 100 performs the PUCCH transmission has been described as an example, but the present disclosure is not limited thereto. For example, the above-described operation example may be applied to a case where the UE 100 performs the PUSCH transmission.

For example, in a case of (a) performing retuning or switching from the first frequency band for transmitting the PUSCH to the second frequency band for transmitting the PUSCH, the controller 140 of the UE 100 may determine the number of symbols corresponding to the guard duration according to the above-described operation example. That is, when the frequency band is changed from the first frequency band in which the PUSCH transmission is performed to the second frequency band in which the PUSCH transmission is performed, the controller 140 of the UE 100 may generate the guard duration, and the number of symbols corresponding to the guard duration may be given by the subcarrier spacing configured by the base station 200. In addition, as described above, in a case of (b) performing retuning or switching from the first frequency band for transmitting the PUCCH to the second frequency band for transmitting the PUCCH, the controller 140 of the UE 100 may determine the number of symbols corresponding to the guard duration according to the above-described operation example. That is, when the frequency band is changed from the first frequency band in which the PUCCH transmission is performed to the second frequency band in which the PUCCH transmission is performed, the controller 140 of the UE 100 may generate the guard duration, and the number of symbols corresponding to the guard duration may be given by the subcarrier spacing configured by the base station 200. Further, in a case of (c) performing retuning or switching from the first frequency band for transmitting the PUCCH to the second frequency band for transmitting the PUSCH, the controller 140 of the UE 100 may determine the number of symbols corresponding to the guard duration according to the above-described operation example. That is, when the frequency band is changed from the first frequency band in which the PUCCH transmission is performed to the second frequency band in which the PUSCH transmission is performed, the controller 140 of the UE 100 may generate the guard duration, and the number of symbols corresponding to the guard duration may be given by the subcarrier spacing configured by the base station 200. In addition, in a case of (d) performing retuning or switching from the first frequency band for transmitting the PUSCH to the second frequency band for transmitting the PUCCH, the controller

140 of the UE 100 may determine the number of symbols corresponding to the guard duration according to the above-described operation example. That is, when the frequency band is changed from the first frequency band in which the PUSCH transmission is performed to the second frequency band in which the PUCCH transmission is performed, the controller 140 of the UE 100 may generate the guard duration, and the number of symbols corresponding to the guard duration may be given by the subcarrier spacing configured by the base station 200.

Here, the capability information of the UE 100 may be defined for each of one or more of the above (a) and (b). That is, the capability information of the UE 100 corresponding to each of one or more of the above (a) and (b) may be defined. For example, the UE 100 may transmit the capability information of the UE 100 corresponding to each of one or more of the above (a) and (b) to the base station 200.

In addition, the controller 140 of the UE 100 may determine the number of symbols corresponding to the guard duration based on a combination of a channel used for uplink transmission in the first frequency band and a channel used for uplink transmission in the second frequency band. For example, when the channels used for the uplink transmission are different in the first frequency band and the second frequency band (the case of the above (a) or (b)), the controller 140 of the UE 100 may increase the number of symbols configuring the guard duration as compared with the case where the channels used for the uplink transmission are the same in the first frequency band and the second frequency band (the case of the above (c) or (d)).

In addition, in the cases of the above (a) and (b), the controller 140 of the UE 100 may determine the number (hereinafter, the first number of symbols) from the last symbol to be used in the guard duration in the transmission occasion (for example, the first hop for PUCCH transmission) in the first frequency band based on the subcarrier spacing of the BWP in the first frequency band, and may determine the number (hereinafter, the second number of symbols) from the first symbol to be used in the guard duration in the transmission occasion (for example, the second hop for PUCCH transmission) in the second frequency band based on the subcarrier spacing of the BWP in the second frequency band. The controller 140 of the UE 100 may configure the sum of the first number of symbols and the second number of symbols as the length of the guard duration.

In addition, in the case of the above (c), the controller 140 of the UE 100 may determine the number (second number of symbols) from the first symbol to be used in the guard duration in the transmission occasion (for example, the second hop for PUSCH transmission) in the second frequency band. The controller 140 of the UE 100 may configure the second number of symbols as the length of the guard duration.

In addition, in the case of the above (d), the controller 140 of the UE 100 may determine the number (first number of symbols) from the last symbol to be used in the guard duration in the transmission occasion (for example, the occasion for PUSCH transmission) in the first frequency band. The controller 140 of the UE 100 may configure the first number of symbols as the length of the guard duration.

In the above-described embodiment, the base station 200 may include a plurality of units. The plurality of units may include a first unit that hosts a higher layer included in the protocol stack and a second unit that hosts a lower layer included in the protocol stack. The higher layer may include an RRC layer, an SDAP layer, and a PDCP layer, and the lower layer may include an RLC layer, a MAC layer, and a PHY layer. The first unit may be a central unit (CU), and the second unit may be a distributed unit (DU). The plurality of units may include a third unit that performs processing of a lower layer of the PHY layer. The second unit may perform processing of a higher layer of the PHY layer. The third unit may be a radio unit (RU). The base station 200 may be one of the plurality of units, and may be connected to another unit of the plurality of units. In addition, the base station 200 may be an integrated access and backhaul (IAB) donor or an IAB node.

In the above-described embodiment, a mobile communication system based on the NR is described as an example of the mobile communication system 1. However, the mobile communication system 1 is not limited to this example. The mobile communication system 1 may be a system conforming to a TS of any of LTE or another generation system (for example, sixth generation) of the 3GPP standard. The base station 200 may be an eNB providing protocol terminations of E-UTRA user plane and control plane toward the UE 100 in LTE. The mobile communication system 1 may be a system conforming to a TS defined in a standard other than the 3GPP standard.

The steps in the operation of the above-described embodiment may not necessarily be execute in chronological order according to the order described in the flow diagram or sequence diagram. For example, the steps in the operation may be performed in order different from the order described as the flow diagram or sequence diagram, or may be performed in parallel. In addition, some of the steps in the operation may be removed and additional steps may be added to the processing. Furthermore, each operation flow described above is not necessarily implemented separately and independently and a combination of two or more operation flows can be implemented. For example, some steps of one operation flow may be added to another operation flow, or some steps of one operation flow may be replaced with some steps of another operation flow.

A program for causing a computer to execute each processing performed by the UE 100 or the base station 200 may be provided. The program may be recorded on a computer readable medium. The program can be installed in the computer by using the computer readable medium. Here, the computer readable medium on which the program is recorded may be a non-transitory recording medium. The non-transitory recording medium is not particularly limited, but may be, for example, a recording medium such as a compact disk read only memory (CD-ROM) or a digital versatile disc read only memory (DVD-ROM). Furthermore, a circuit that executes each processing to be performed by the UE 100 or the base station 200 may be integrated, and at least a part of the UE 100 or the base station 200 may be configured as a semiconductor integrated circuit (chipset, SoC (system-on-chip)).

In the above-described embodiment, "transmit" may mean to perform processing of at least one layer in a protocol stack used for transmission, or may mean to physically transmit a signal wirelessly or by wire. Alternatively, "transmit" may mean a combination of performing the processing of at least one layer and physically transmitting a signal wirelessly or by wire. Similarly, "receive" may mean to perform processing of at least one layer in a protocol stack used for reception, or may mean to physically receive a signal wirelessly or by wire. Alternatively, "receive" may mean a combination of performing the processing of at least one layer and physically receiving a signal wirelessly or by wire. Similarly, "acquire (obtain/acquire)"

may mean to acquire information from stored information, may mean to acquire information from information received from another node, or may mean to acquire the information by generating information. Similarly, the descriptions "based on" and "depending on/in response to" do not mean "based only on" or "depending only on" unless explicitly stated otherwise. The description "based on" means both "based only on" and "based at least in part on". Similarly, the description "according to" means both "only according to" and "at least partially according to". Similarly, "include" and "comprise" do not mean to include only the listed items, but mean that the terms may include only the listed items or may include additional items in addition to the listed items. Similarly, in the present disclosure, "or" does not mean exclusive OR but means OR. Moreover, any reference to elements using designations such as "first", "second", and the like used in the present disclosure does not generally limit the amount or order of those elements. These designations may be used in the present disclosure as a convenient method to distinguish between two or more elements. Therefore, references to first and second elements do not mean that only two elements can be employed therein or that the first element should precede the second element in any form. In the present disclosure, when articles such as a, an, and the in English are added by translation, it is assumed that these articles include the plural unless the context clearly indicates otherwise. Although the present disclosure has been described according to examples, it is understood that the present disclosure is not limited to the examples and structures. The present disclosure also includes various modifications and modifications within an equivalent range. In addition, various combinations and modes, and other combinations and modes including only one element, more elements, or less elements are also within the scope and idea of the present disclosure.

Supplementary Note

Features related to the above-described embodiment are additionally described.

(Supplementary Note 1)

A communication apparatus (100) comprising:

a controller (140); and a communicator (120) configured to receive a system information block 1, wherein in a case where first information for configuring an initial uplink bandwidth part, second information for configuring a resource of a physical uplink control channel, and information indicating whether or not intra-slot frequency hopping for transmission of the physical uplink control channel is valid are included in the system information block 1, and a case where the communication apparatus does not have information for configuring a resource of a physical uplink control channel specific to the communication apparatus, the controller is configured to determine whether or not the intra-slot frequency hopping for transmission of the physical uplink control channel is valid based on the information indicating whether or not the intra-slot frequency hopping is valid, and determine a resource of the physical uplink control channel in the initial uplink bandwidth part specified based on the first information based on the second information, and the first information includes information indicating a location and a bandwidth in a frequency domain of the initial uplink bandwidth part and information indicating a subcarrier spacing of the initial uplink bandwidth part.

(Supplementary Note 2)

The communication apparatus according to supplementary note 1, wherein the communicator is configured to transmit uplink control information by using the resource of the physical uplink control channel determined based on the second information.

(Supplementary Note 3)

The communication apparatus according to supplementary note 2, wherein in a case where the first information is not configured and third information for configuring the initial uplink bandwidth part is configured, the controller is configured to specify the initial uplink bandwidth part based on the third information, the communicator is configured to validate frequency hopping for transmission of the physical uplink control channel and transmit the uplink control information within the initial uplink bandwidth part specified based on the third information, and the third information includes information indicating a location and a bandwidth in a frequency domain of the initial uplink bandwidth part and information indicating a subcarrier spacing of the initial uplink bandwidth part.

(Supplementary Note 4)

The communication apparatus according to any one of supplementary notes 1 to 3, wherein the communication apparatus is a RedCap user equipment.

(Supplementary Note 5)

A base station apparatus (200) communicating with a communication apparatus (100), comprising:

a controller (240) including, in the system information block 1, first information for configuring an initial uplink bandwidth part, second information for configuring a resource of a physical uplink control channel, and information indicating whether or not intra-slot frequency hopping for reception of the physical uplink control channel is valid; and a communicator (220) configured to transmit the system information block 1 to the communication apparatus in which information for configuring a resource of a physical uplink control channel specific to the communication apparatus is not configured, wherein the first information includes information indicating a location and a bandwidth in a frequency domain of the initial uplink bandwidth part and information indicating a subcarrier spacing of the initial uplink bandwidth part.

(Supplementary Note 6)

The base station apparatus according to supplementary note 5, wherein the communicator is configured to receive uplink control information by using the resource of the physical uplink control channel determined based on the second information.

(Supplementary Note 7)

The base station apparatus according to supplementary note 6, wherein in a case where the first information is not included in the system information block 1 and third information for configuring the initial uplink bandwidth part is included in the system information block 1, the controller is configured to specify the initial uplink bandwidth part based on the third information, and the communicator is configured to validate the intra-slot frequency hopping for reception of the physical uplink control channel, and receive the uplink control information within the initial uplink bandwidth part specified based on the third information.

(Supplementary Note 8)

The base station apparatus according to any one of supplementary notes 5 to 7, wherein the communication apparatus is a RedCap user equipment.

(Supplementary Note 9)

A communication method executed by a communication apparatus, comprising the steps of:

receiving a system information block 1; and in a case where first information for configuring an initial uplink bandwidth part, second information for configuring a resource of a physical uplink control channel, and information indicating whether or not intra-slot frequency hopping for transmission of the physical uplink control channel is valid are included in the system information block 1, and a case where the communication apparatus does not have information for configuring a resource of a physical uplink control channel specific to the communication apparatus, determining whether or not the intra-slot frequency hopping for transmission of the physical uplink control channel is valid based on the information indicating whether or not the intra-slot frequency hopping is valid, and determining a resource of the physical uplink control channel in the initial uplink bandwidth part specified based on the first information based on the second information, wherein the first information includes information indicating a location and a bandwidth in a frequency domain of the initial uplink bandwidth part and information indicating a subcarrier spacing of the initial uplink bandwidth part.

Note that the "second information" described in Supplementary Note may correspond to, for example, the first PUCCH configuration information.

The invention claimed is:

1. A communication apparatus comprising:

a controller; and a receiver configured to receive, from a base station apparatus, a system information block 1 (SIB1), wherein in a case where first information for configuring an initial uplink bandwidth part (BWP), second information for configuring a resource of a physical uplink control channel (PUCCH) for transmission of HARQ-ACK, and third information for indicating whether or not intra-slot frequency hopping for transmission of the PUCCH is enabled are included in the SIB1, and a case where the communication apparatus does not receive information specific to the communication apparatus for configuring a resource of the PUCCH, the controller is configured to determine whether or not the intra-slot frequency hopping for transmission of the PUCCH is enabled based on the third information, and determine, based on the second information, the resource of the PUCCH on the initial uplink BWP configured based on the first information, and the first information includes information for indicating frequency domain location and bandwidth of the initial uplink BWP and information for indicating a subcarrier spacing of the initial uplink BWP.

2. The communication apparatus according to claim 1, comprising a transmitter, wherein the transmitter is configured to transmit, to the base station apparatus, the HARQ-ACK by using the determined resource of the PUCCH with the intra-slot frequency hopping in a case where the intra-slot frequency hopping is enabled, and transmit, to the base station apparatus, the HARQ-ACK by using the determined resource of the PUCCH without the intra-slot frequency hopping in a case where the intra-slot frequency hopping is disabled.

3. The communication apparatus according to claim 2, wherein in a case where the first information is not included in the SIB1 and fourth information for configuring the initial uplink BWP is included in the SIB1, the controller is configured to determine the initial uplink BWP based on the fourth information, the controller is configured to enable the intra-slot frequency hopping for transmission of the PUCCH, the transmitter is configured to transmit, to the base station apparatus, the HARQ-ACK by using a resource of the PUCCH with the intra-slot frequency hopping on the initial uplink BWP configured based on the fourth information, and the fourth information includes information for indicating frequency domain location and bandwidth of the initial uplink BWP and information for indicating a subcarrier spacing of the initial uplink BWP.

4. The communication apparatus according to claim 1, wherein the resource of the PUCCH is mapped to one edge in the frequency domain within the initial uplink BWP, and the controller is configured to determine an index of a physical resource block of the PUCCH based on the first information and the second information.

5. The communication apparatus according to claim 1, wherein the communication apparatus is a RedCap user equipment, and in a case where the first information is included in the SIB1 and the third information is not included in the SIB1, the controller is configured to disable the intra-slot frequency hopping of transmission of the PUCCH.

6. A base station apparatus communicating with a communication apparatus, comprising:

a controller including, in a system information block 1 (SIB1), first information for configuring an initial uplink bandwidth part (BWP), second information for configuring a resource of a physical uplink control channel (PUCCH) for transmission of HARQ-ACK, and third information for indicating whether or not intra-slot frequency hopping for transmission of the PUCCH is enabled; and a transmitter configured to transmit the SIB1 to the communication apparatus which does not receive information specific to the communication apparatus for configuring a resource of the PUCCH, wherein the first information includes information for indicating frequency domain location and a bandwidth of the initial uplink BWP and information for indicating a subcarrier spacing of the initial uplink BWP.

7. The base station apparatus according to claim 6, comprising a receiver wherein the receiver is configured to receive, from the communication apparatus, the HARQ-ACK by using the determined resource of the PUCCH with the intra-slot frequency hopping in a case where the intra-slot frequency hopping is enabled, and receive, from the communication apparatus, the HARQ-ACK by using the determined resource of the PUCCH without the intra-slot frequency hopping in a case where the intra-slot frequency hopping is disabled.

8. The base station apparatus according to claim 7, wherein in a case where the first information is not included in the SIB1 and fourth information for configuring the initial uplink BWP is included in the SIB1, the controller is configured to determine the initial uplink BWP based on the fourth information, the controller is configured to enable the intra-slot frequency hopping for reception of the PUCCH, and the receiver is configured to receive, from the communication apparatus, the HARQ-ACK by using a resource of the PUCCH with the intra-slot frequency hopping on the initial uplink BWP configured based on the fourth information the fourth information includes information for indicating frequency domain location and bandwidth of the initial uplink BWP and information for indicating a subcarrier spacing of the initial uplink BWP.

9. The base station apparatus according to claim 6, wherein the resource of the PUCCH is mapped to one edge in the frequency domain within the initial uplink BWP, and an index of a physical resource block of the PUCCH is determined on a basis of the first information and the second information.

10. The base station apparatus according to claim 6, wherein the communication apparatus is a RedCap user equipment, and in a case where the first information is included in the SIB1 and the third information is not included in the SIB1, the controller is configured to disable the intra-slot frequency hopping of transmission of the PUCCH.

11. A communication method executed by a communication apparatus, the communication method comprising the steps of:

receiving, from a base station apparatus, a system information block 1 (SIB1); and in a case where first information for configuring an initial uplink bandwidth part (BWP), second information for configuring a resource of a physical uplink control channel (PUCCH) for transmission of HARQ-ACK, and third information for indicating whether or not intra-slot frequency hopping for transmission of the PUCCH is enabled are included in the SIB1, and a case where the communication apparatus does not receive information specific to the communication apparatus for configuring a resource of the PUCCH, determining whether or not the intra-slot frequency hopping for transmission of the PUCCH is enabled based on the third information, and determining, based on the second information, the resource of the PUCCH on the initial uplink BWP configured based on the first information, wherein the first information includes information for indicating frequency domain location and bandwidth of the initial uplink BWP and information for indicating a subcarrier spacing of the initial uplink BWP.

12. The communication method according to claim 11, the communication method comprising the steps of:

transmitting, to the base station apparatus, the HARQ-ACK by using the determined resource of the PUCCH with the intra-slot frequency hopping in a case where the intra-slot frequency hopping is enabled; and transmitting, to the base station apparatus, the HARQ-ACK by using the determined resource of the PUCCH without the intra-slot frequency hopping in a case where the intra-slot frequency hopping is disabled.

13. The communication method according to claim 12, the communication method comprising the steps of:

in a case where the first information is not included in the SIB1 and fourth information for configuring the initial uplink BWP is included in the SIB1, determining the initial uplink BWP based on the fourth information; and enabling the intra-slot frequency hopping for transmission of the PUCCH and transmitting, to the base station apparatus, the HARQ-ACK by using a resource of the PUCCH with the intra-slot frequency hopping on the initial uplink BWP configured based on the fourth information, wherein the fourth information includes information for indicating frequency domain location and bandwidth of the initial uplink BWP and information for indicating a subcarrier spacing of the initial uplink BWP.

14. The communication method according to claim 11, wherein the resource of the PUCCH is mapped to one edge in the frequency domain within the initial uplink BWP, and the communication method comprising the steps of:

determining an index of a physical resource block of the PUCCH based on the first information and the second information.

15. The communication method according to claim 11, wherein the communication apparatus is a RedCap user equipment, and the communication method comprising the steps of:

in a case where the first information is included in the SIB1 and the third information is not included in the SIB1, disabling the intra-slot frequency hopping of transmission of the PUCCH.

* * * * *